(12) United States Patent
Furukawa

(10) Patent No.: US 10,366,631 B2
(45) Date of Patent: Jul. 30, 2019

(54) SYSTEM, METHOD, APPARATUS, AND CONTROL METHODS FOR CIPHERTEXT COMPARISON

(71) Applicant: NEC Corporation, Tokyo (JP)

(72) Inventor: Jun Furukawa, Tokyo (JP)

(73) Assignee: NEC Corporation, Tokyo (JP)

(*) Notice: Subject to any disclaimer, the term of this patent is extended or adjusted under 35 U.S.C. 154(b) by 240 days.

(21) Appl. No.: 15/027,602

(22) PCT Filed: Jun. 16, 2014

(86) PCT No.: PCT/JP2014/065858
§ 371 (c)(1),
(2) Date: Apr. 6, 2016

(87) PCT Pub. No.: WO2015/052957
PCT Pub. Date: Apr. 16, 2015

(65) Prior Publication Data
US 2016/0240108 A1 Aug. 18, 2016

(30) Foreign Application Priority Data
Oct. 8, 2013 (JP) ................. 2013-211214

(51) Int. Cl.
H04L 29/06 (2006.01)
G09C 1/00 (2006.01)
H04L 9/06 (2006.01)

(52) U.S. Cl.
CPC .............. *G09C 1/00* (2013.01); *H04L 9/0618* (2013.01)

(58) Field of Classification Search
CPC ....... G09C 1/00; H04L 9/0618; H04L 9/0861; H04L 9/0643
See application file for complete search history.

(56) References Cited

U.S. PATENT DOCUMENTS

| | | | | |
|---|---|---|---|---|
| 6,816,968 B1* | 11/2004 | Walmsley | ............... | G06F 21/31 380/259 |
| 2008/0282096 A1* | 11/2008 | Agrawal | ................. | G06F 21/60 713/193 |

FOREIGN PATENT DOCUMENTS

| | | | | |
|---|---|---|---|---|
| CN | 1558594 A | * | 1/2004 | ............... H04L 9/14 |
| WO | WO-2013-005505 A1 | | 1/2013 | |

OTHER PUBLICATIONS

International Search Report corresponding to PCT/JP2014/065858, dated Aug. 5, 2014, 3 pages.
(Continued)

*Primary Examiner* — Harunur Rashid
(74) *Attorney, Agent, or Firm* — Wilmer Cutler Pickering Hale and Dorr LLP

(57) ABSTRACT

A ciphertext generation apparatus that can compare the magnitudes of encrypted numerical values and largely reduce the risk of information leakage while maintaining the confidentiality. This apparatus includes a derived key generator that generates a derived key based on a main key and a document, an auxiliary derived key generator that generates an auxiliary derived key based on the main key, the document, and the derived key, an identifier-specific ciphertext generator that generates, based on an identifier of the document, the derived key, and the auxiliary derived key, an identifier-specific ciphertext in which the identifier is encrypted, and a relative value ciphertext generator that generates, based on the identifier and the derived key, a relative value ciphertext. A character string including the identifier-specific ciphertext and the relative value ciphertext is generated as a ciphertext for the document.

9 Claims, 20 Drawing Sheets

(56) References Cited

OTHER PUBLICATIONS

Furukawa Jun, Request-Based Comparable Encryption, Computer Security—ESORICS 2013, Sep. 2013, pp. 129-146.
Georgios Amanatidis, et al., "Provably-Secure Schemes for Basic Query Support in Outsourced Databases," Data and Applications Security, 2007, pp. 14-30.
Alexandra Boldyreva, et al., "Order-Preserving Symmetric Encryption," EUROCRYPT, 2009, pp. 224-241.
Furukawa, Jun, "Short Comparable Encryption," LNCS Cryptology and Network Security, vol. 8813, pp. 337-352 (Oct. 24, 2014).
Japanese Office Action issued by the Japan Patent Office for Japanese Application No. 2015-541450 dated Jul. 3, 2018 (8 pages).

* cited by examiner

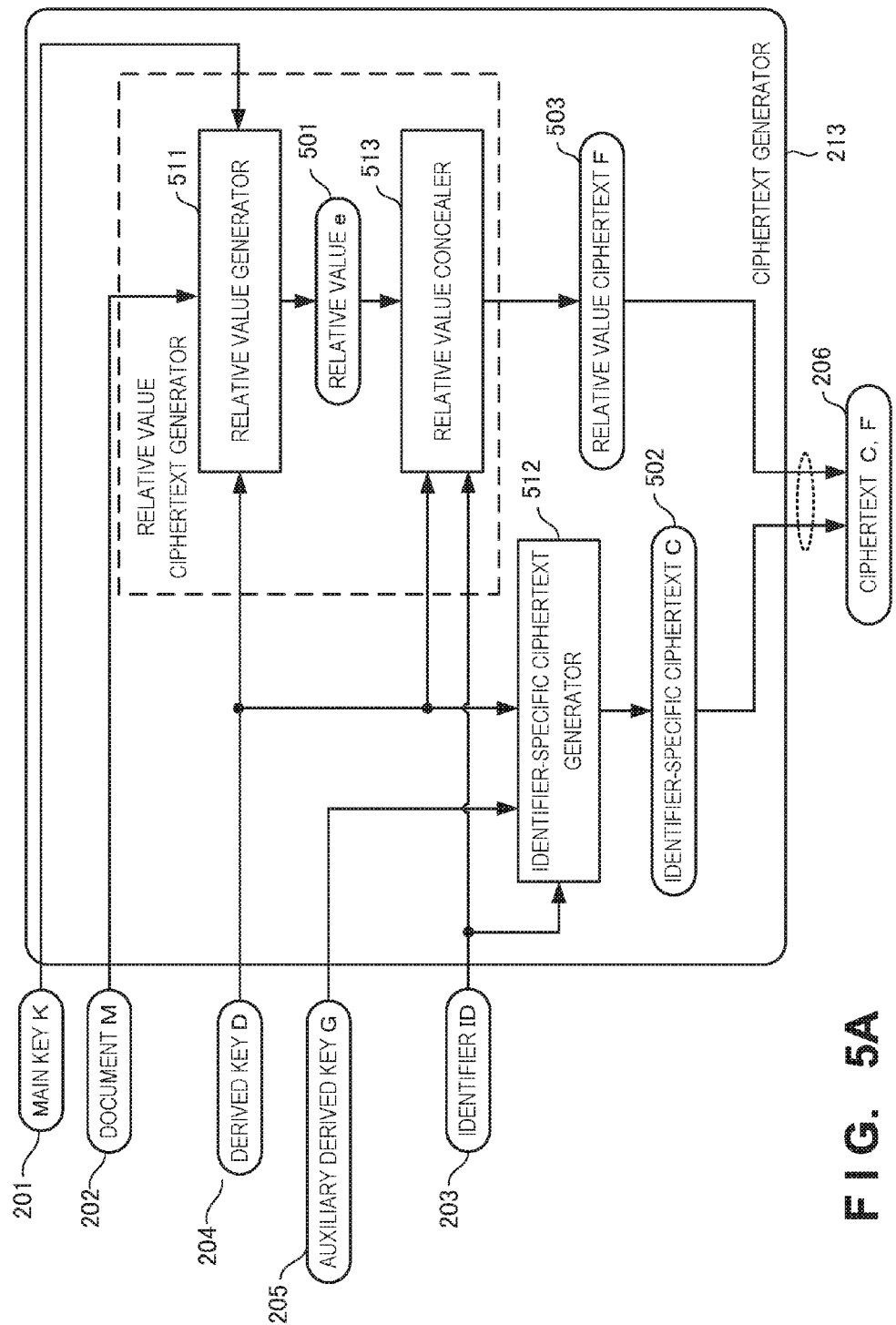
F I G. 5A

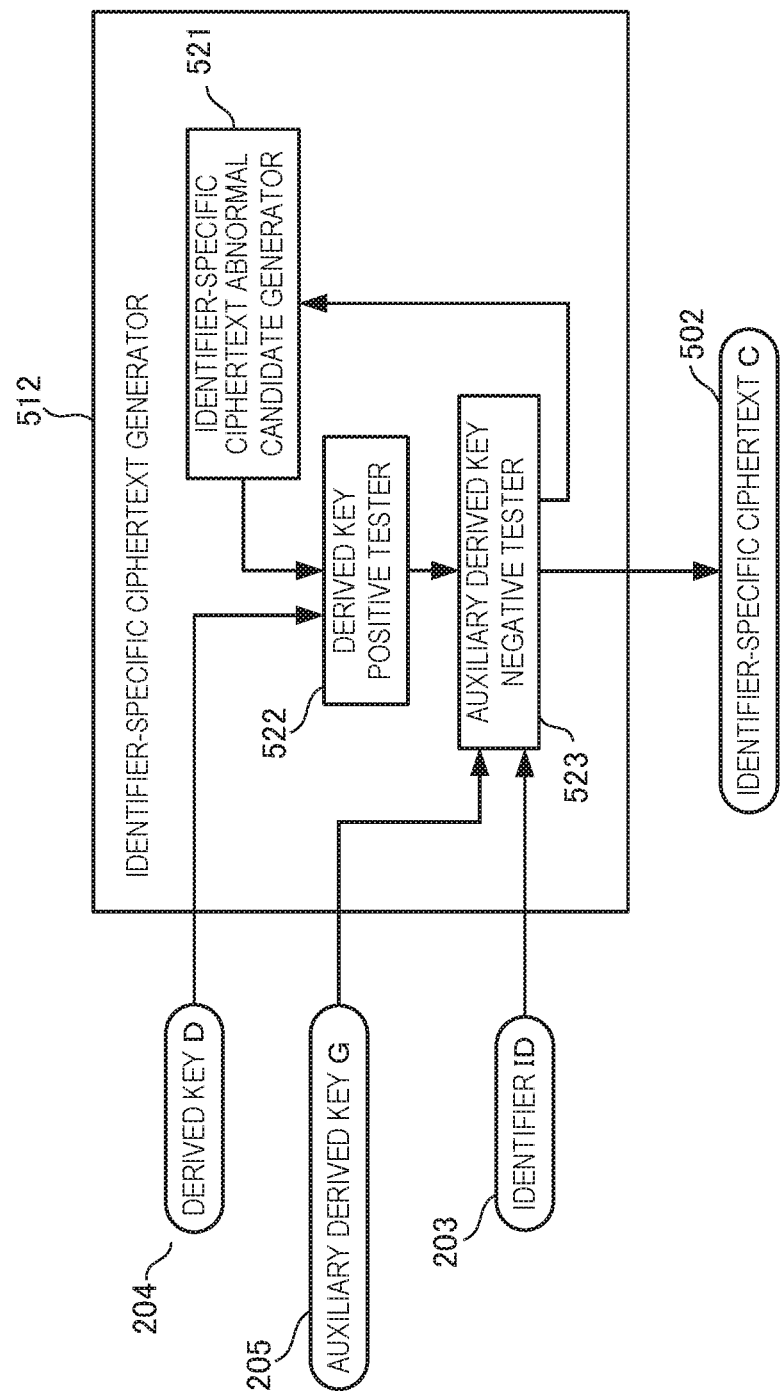
F I G. 5B

| IDENTIFIER ID | DOCUMENT M | MAIN KEY K | DERIVED KEY D | AUXILIARY DERIVED KEY G | CIPHERTEXT | |
|---|---|---|---|---|---|---|
| | | | | | IDENTIFIER-SPECIFIC CIPHERTEXT C | RELATIVE VALUE CIPHERTEXT F |
| | | | | | | |
| ... | | | | | | |

FIG. 8

SYSTEM, METHOD, APPARATUS, AND CONTROL METHODS FOR CIPHERTEXT COMPARISON

CROSS-REFERENCE TO RELATED APPLICATIONS

This application is a national stage application of International Application No. PCT/JP2014/065858 entitled "CIPHERTEXT COMPARISON SYSTEM, CIPHERTEXT COMPARISON METHOD, CIPHERTEXT GENERATION APPARATUS, CIPHERTEXT COMPARISON APPARATUS, AND CONTROL METHODS AND CONTROL PROGRAMS OF CIPHERTEXT GENERATION APPARATUS AND CIPHERTEXT COMPARISON APPARATUS," filed on Jun. 16, 2014, which claims the benefit of the priority of Japanese Patent Application No. 2013-211214 filed on Oct. 8, 2013, the disclosures of each of which are hereby incorporated by reference in their entirety.

TECHNICAL FIELD

The present invention relates to a ciphertext comparison system, a ciphertext comparison method, a ciphertext generation apparatus, a ciphertext comparison apparatus, and control programs of the ciphertext generation apparatus and ciphertext comparison apparatus.

BACKGROUND ART

In the above technical field, non-patent literature 1 discloses a technique of comparing the magnitudes of encrypted numerical values as follows. When a numerical value M as a plaintext and a key K are provided, a ciphertext C is generated as C=Enc(K, M) using an encryption function Enc. At this time, with respect to two arbitrary numbers M and M' satisfying M>M', Enc(K, M)>Enc(K, M') holds. That is, when C=Enc(K, M) and C'=Enc(K, M'), the magnitude relationship between the numerical values M and M' can be known without decrypting the ciphertexts C and C'.

Non-patent literature 2 discloses a technique of comparing the magnitudes of encrypted numerical values as follows. Non-patent literature 2 is a kind of common key cryptography in which a document M as a plaintext divided into a plurality of blocks like M=(b[1], . . . , b[n]) is encrypted to generate a ciphertext of a plurality of blocks like C=(c[1], . . . , c[n]). If two plaintexts match each other with respect to the first k blocks, their ciphertexts also match each other with respect to the first k blocks. This method can thus determine that the plaintexts partially match each other in a ciphertext form.

CITATION LIST

Non-Patent Literature

Non-patent literature 1: Alexandra Boldyreva, Nathan Chenette, Younho Lee, Adam O'Neill: "Order-Preserving Symmetric Encryption. EUROCRYPT" 2009: 224-241.

Non-patent literature 2: Georgios Amanatidis, Alexandra Boldyreva, Adam O'Neill: "Provably-Secure Schemes for Basic Query Support in Outsourced Databases". DBSec 2007: 14-30.

SUMMARY OF THE INVENTION

Technical Problem

In the techniques described in the above literatures, even if the magnitudes of encrypted numerical values can be compared, it is impossible to reduce the risk of information leakage as much as expected. In the technique described in non-patent literature, if a sequence of ciphertexts is provided, the magnitude relationship between corresponding plaintexts is directly known without having any knowledge of a key. Since the method described in non-patent literature 1 requires preserving the order of data before and after encryption, the approximate magnitude of a plaintext is undesirably known from its ciphertext.

In operating a database, the user may request the database to return all tuples, in which a given attribute is larger or smaller than a given number, from a table of a set of tuples having various attributes. If the database is encrypted by the method described in non-patent literature 1, even if the database does not know a key used for encryption, it can determine the magnitudes of the numerical values, and thus respond to the request of the user. However, although the database need only determine the magnitudes of the numerical values when the user issues a request, it can make determination even if the user does not issue any request. This unnecessary ability increases the risk of information leakage from the database.

On the other hand, in non-patent literature 2, it is possible to know that ciphertexts match each other with respect to the first k blocks, but it is impossible to directly determine magnitudes. Thus, it is necessary to send all candidate ciphertexts which match with respect to the first k blocks. Furthermore, since it is possible to directly determine that two ciphertexts match each other with respect to the first k blocks without holding a key for encryption, if this is used for a database, the risk of information leakage from the database increases.

To solve the above-described problems, the present invention enables to provide a technique capable of comparing the magnitudes of encrypted numerical values and largely reducing the risk of information leakage while maintaining the confidentiality.

Solution to Problem

One aspect of the present invention provides a ciphertext generation apparatus comprising:

a derived key generator that generates a derived key based on a main key and a document;

an auxiliary derived key generator that generates an auxiliary derived key based on the main key, the document, and the derived key;

an identifier-specific ciphertext generator that generates, based on an identifier of the document, the derived key, and the auxiliary derived key, an identifier-specific ciphertext in which the identifier is encrypted; and a relative value ciphertext generator that generates, based on the identifier and the derived key, a relative value ciphertext in which a relative value generated from the main key, the document, and the derived key is encrypted, wherein a character string including the identifier-specific ciphertext and the relative value ciphertext is generated as a ciphertext for the document.

Another aspect of the present invention provides a control method of a ciphertext generation apparatus, comprising:

generating a derived key based on a main key and a document;

generating an auxiliary derived key based on the main key, the document, and the derived key;

generating, based on an identifier of the document, the derived key, and the auxiliary derived key, an identifier-specific ciphertext in which the identifier is encrypted; and generating, based on the identifier and the derived key, a relative value ciphertext in which a relative value generated from the main key, the document, and the derived key is encrypted, wherein a character string including the identifier-specific ciphertext and the relative value ciphertext is generated as a ciphertext for the document.

Still other aspect of the present invention provides a control program of a ciphertext generation apparatus for causing a computer to execute a method, comprising:

generating a derived key based on a main key and a document;

generating an auxiliary derived key based on the main key, the document, and the derived key;

generating, based on an identifier of the document, the derived key, and the auxiliary derived key, an identifier-specific ciphertext in which the identifier is encrypted; and generating, based on the identifier and the derived key, a relative value ciphertext in which a relative value generated from the main key, the document, and the derived key is encrypted, wherein a character string including the identifier-specific ciphertext and the relative value ciphertext is generated as a ciphertext for the document.

Still other aspect of the present invention provides a ciphertext comparison apparatus comprising:

a first ciphertext acquirer that acquires a first ciphertext encrypted by the above mentioned ciphertext generation apparatus, a first identifier, and a first derived key;

a second ciphertext acquirer that acquires a second ciphertext encrypted by the above mentioned ciphertext generation apparatus and a second identifier; and a ciphertext comparator that determines a magnitude relationship between a first document as an original of the first ciphertext and a second document as an original of the second ciphertext with maintaining these documents in a ciphertext form, using the first ciphertext, the first identifier, the first derived key, the second ciphertext, and the second identifier.

Still other aspect of the present invention provides a control method of a ciphertext comparison apparatus, comprising:

acquiring a first ciphertext encrypted by the above mentioned ciphertext generation apparatus, a first identifier, and a first derived key;

acquiring a second ciphertext encrypted by the above mentioned ciphertext generation apparatus and a second identifier; and determining a magnitude relationship between a first document as an original of the first ciphertext and a second document as an original of the second ciphertext with maintaining these documents in a ciphertext form, using the first ciphertext, the first identifier, the first derived key, the second ciphertext, and the second identifier.

Still other aspect of the present invention provides a control program of a ciphertext comparison apparatus for causing a computer to execute a method, comprising:

acquiring a first ciphertext encrypted by the above mentioned ciphertext generation apparatus, a first identifier, and a first derived key;

acquiring a second ciphertext encrypted by the above mentioned ciphertext generation apparatus and a second identifier; and determining a magnitude relationship between a first document as an original of the first ciphertext and a second document as an original of the second ciphertext with maintaining these documents in a ciphertext form using the first ciphertext, the first identifier, the first derived key, the second ciphertext, and the second identifier.

Still other aspect of the present invention provides a ciphertext comparison system comprising:

a derived key generator that generates a derived key based on a main key and a document;

an auxiliary derived key generator that generates an auxiliary derived key based on the main key, the document, and the derived key;

an identifier-specific ciphertext generator that generates, based on an identifier of the document, the derived key, and the auxiliary derived key, an identifier-specific ciphertext in which the identifier is encrypted;

a relative value ciphertext generator that generates, based on the identifier and the derived key, a relative value ciphertext in which a relative value generated from the main key, the document, and the derived key is encrypted; and a ciphertext comparator that determines a magnitude relationship between a first document as an original of a first ciphertext and a second document as an original of a second ciphertext with maintaining these documents in a ciphertext form, using a first derived key generated from the first document by the derived key generator, a first identifier of the first document, the first ciphertext including a first identifier-specific ciphertext in which the first identifier is encrypted by the identifier-specific ciphertext generator and a first relative value ciphertext in which a first relative value is encrypted by the relative value ciphertext generator, a second identifier of the second document, and the second ciphertext including a second identifier-specific ciphertext in which the second identifier is encrypted by the identifier-specific ciphertext generator and a second relative value ciphertext in which a second relative value is encrypted by the relative value ciphertext generator.

Still other aspect of the present invention provides a ciphertext comparison method comprising:

generating a derived key based on a main key and a document;

generating an auxiliary derived key based on the main key, the document, and the derived key;

generating, based on an identifier of the document, the derived key, and the auxiliary derived key, an identifier-specific ciphertext in which the identifier is encrypted;

generating, based on the identifier and the derived key, a relative value ciphertext in which a relative value generated from the main key, the document, and the derived key is encrypted; and determining a magnitude relationship between a first document as an original of a first ciphertext and a second document as an original of a second ciphertext with maintaining these documents in a ciphertext form, using a first derived key generated from the first document in the generating the derived key, a first identifier of the first document, the first ciphertext including a first identifier-specific ciphertext in which the first identifier is encrypted in the generating the identifier-specific ciphertext and a first relative value ciphertext in which a first relative value is encrypted in the generating the relative value ciphertext, a second identifier of the second document, and the second ciphertext including a second identifier-specific ciphertext in which the second identifier is encrypted in the generating the identifier-specific ciphertext and a second relative value ciphertext in which a second relative value is encrypted in the generating the relative value ciphertext.

Advantageous Effects of Invention

According to the present invention, it is possible to compare the magnitudes of encrypted numerical values and largely reduce the risk of information leakage while maintaining the confidentiality.

BRIEF DESCRIPTION OF DRAWINGS

FIG. 5A is a block diagram showing the arrangement of the ciphertext generator of the ciphertext generation apparatus according to the second embodiment of the present invention;

FIG. 5B is a block diagram showing the arrangement of an identifier-specific ciphertext generator according to the second embodiment of the present invention;

FIG. 8 is a table showing the structure of a ciphertext generation table according to the second embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

A ciphertext generation apparatus 100 according to the first embodiment of the present invention will be described with reference to FIG. 1. The ciphertext generation apparatus 100 is an apparatus that generates ciphertexts for magnitude comparison in a ciphertext form.

Figure 1:
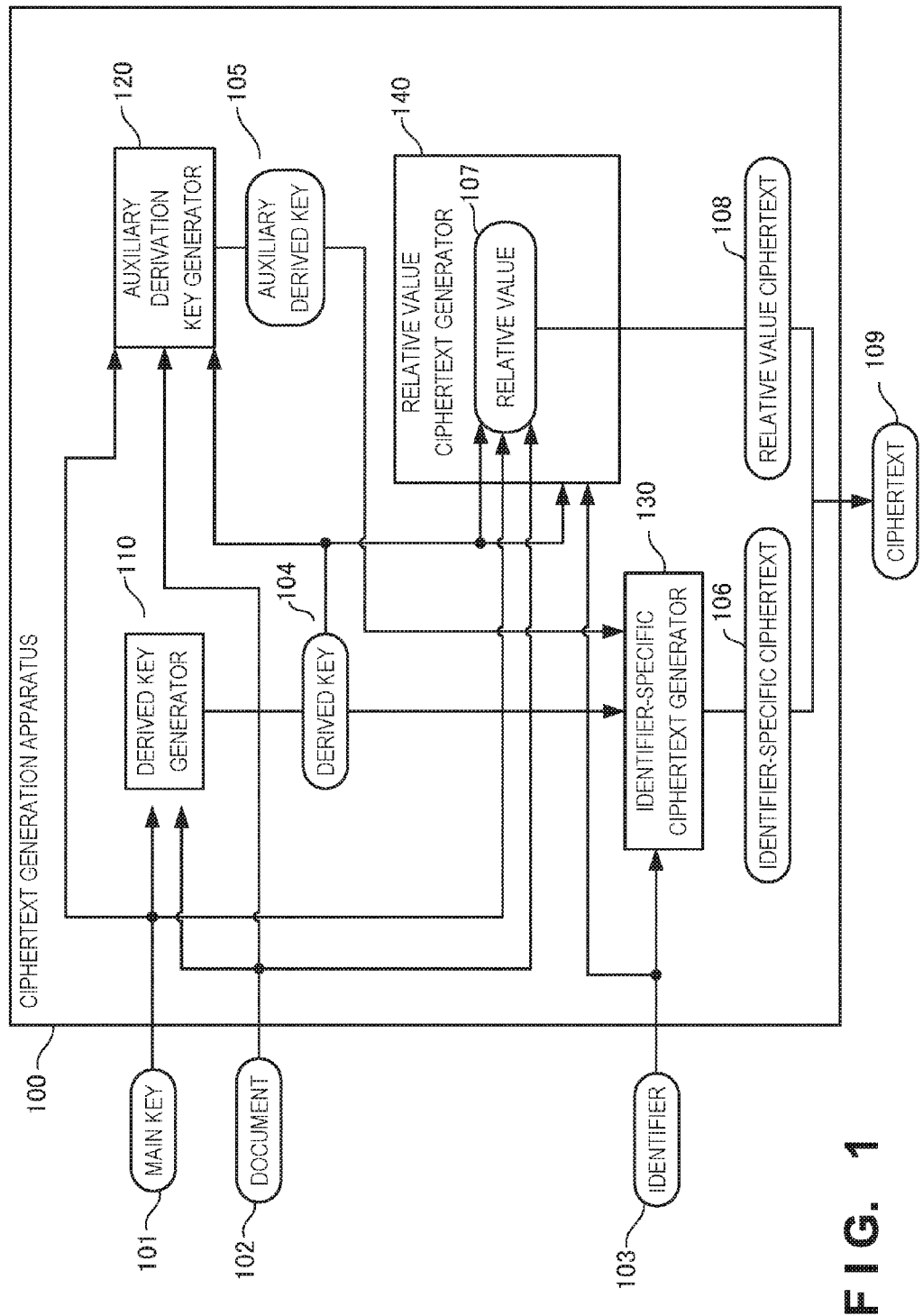
FIG. 1 is a block diagram showing the arrangement of a ciphertext generation apparatus according to the first embodiment of the present invention.

As shown in FIG. 1, the ciphertext generation apparatus 100 includes a derived key generator 110, an auxiliary derived key generator 120, an identifier-specific ciphertext generator 130, and a relative value ciphertext generation 140. The derived key generator 110 generates a derived key 104 based on a main key 101 and a document 102. The auxiliary derived key generator 120 generates an auxiliary derived key 105 based on the main key 101, the document 102, and the derived key 104. Based on an identifier 103 of the document 102, the derived key 104, and the auxiliary derived key 105, the identifier-specific ciphertext generator 130 generates an identifier-specific ciphertext 106 in which the identifier 103 is encrypted. Based on the identifier 103 and the derived key 104, the relative value ciphertext generation 140 generates a relative value ciphertext 108 in which a relative value 107 generated from the main key 101, the document 102, and the derived key 104 is encrypted. The ciphertext generation apparatus 100 sets, as a ciphertext 109 for the document 102, a character string including the identifier-specific ciphertext 106 and the relative value ciphertext 108.

According to this embodiment, by generating a derived key and an auxiliary derived key and using them to generate a ciphertext, it is possible to compare the magnitudes of encrypted numerical values and largely reduce the risk of information leakage while maintaining the confidentiality of numerical data.

[Second Embodiment]

A ciphertext generation apparatus and a ciphertext comparison system including the ciphertext generation apparatus and a ciphertext comparison apparatus according to the second embodiment of the present invention will be described next. In the ciphertext comparison system according to this embodiment, a derived key generator generates a derived key based on a main key and a document. An auxiliary derived key generator generates an auxiliary derived key based on the main key, the document, and the derived key. Based on the identifier of the document, the derived key, and the auxiliary derived key, an identifier-specific ciphertext generator generates an identifier-specific ciphertext in which the identifier is encrypted. Based on the identifier and the derived key, a relative value ciphertext generator generates a relative value ciphertext in which a relative value generated from the main key, the document, and the derived key is encrypted. Using the first derived key generated from the first document, the first identifier of the first document, the first ciphertext including the first identifier-specific ciphertext in which the first identifier is encrypted and the first relative value ciphertext in which the first relative value is encrypted, the second identifier of the second document, and the second ciphertext including the second identifier-specific ciphertext in which the second identifier is encrypted and the second relative value ciphertext in which the second relative value is encrypted, a ciphertext comparator determines the magnitude relationship between the first document as the original of the first ciphertext and the second document as the original of the second ciphertext in a ciphertext form.

Note that the ciphertext generation apparatus includes the derived key generator, the auxiliary derived key generator, the identifier-specific ciphertext generator, and the relative value ciphertext generator, and the ciphertext comparison apparatus includes the ciphertext comparator. However, the ciphertext generation apparatus and the ciphertext comparison apparatus need not be separate apparatuses, and may be integrated in one apparatus.

<<Technical Premise>>

Before explaining a technique according to this embodiment, an overview of the technique of non-patent literature 2 will be described as a technical premise.

Figure 14:
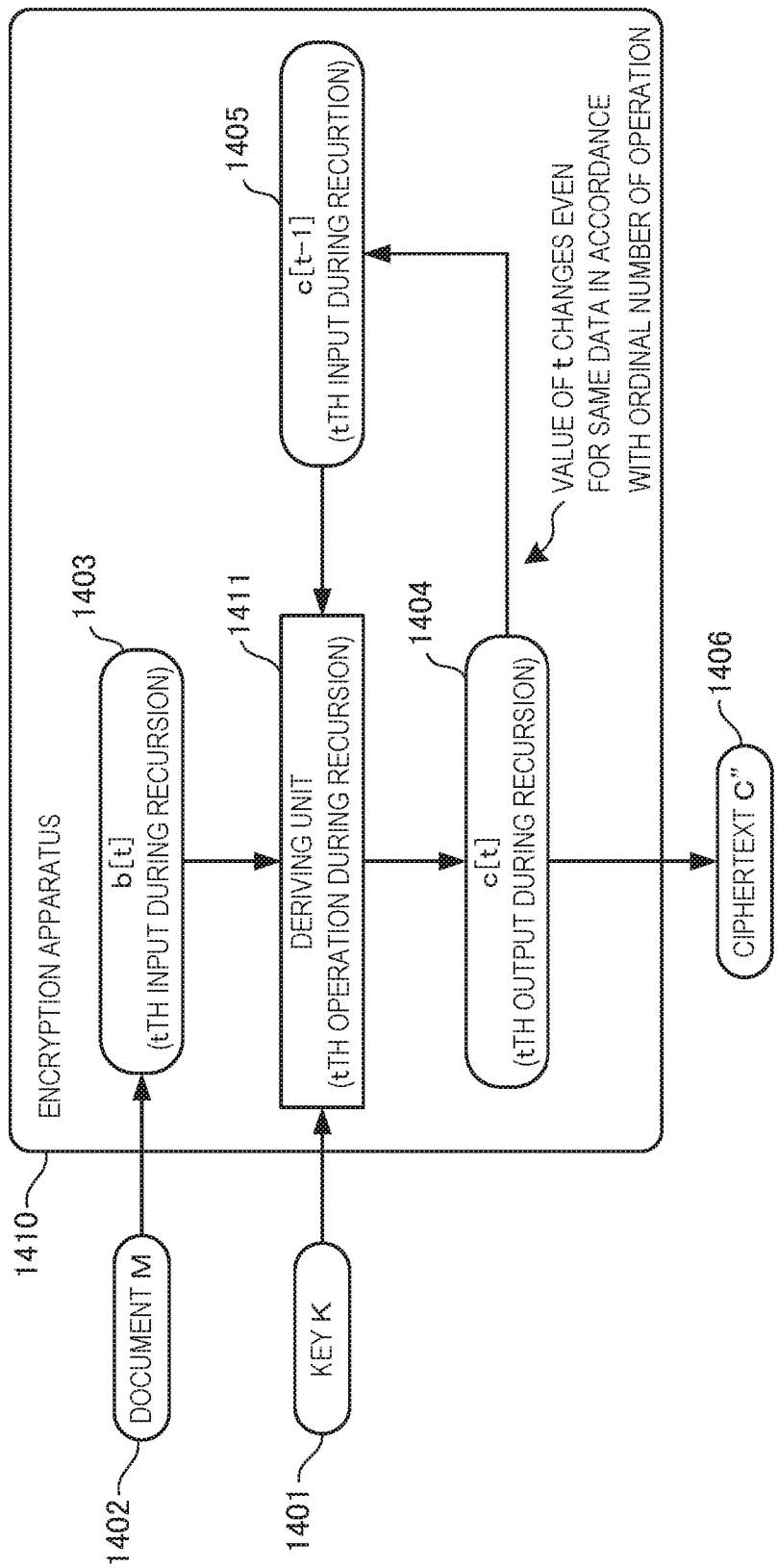
FIG. 14 is a block diagram showing the arrangement of an encryption apparatus according to a technical premise of the present invention.
Figure 15:
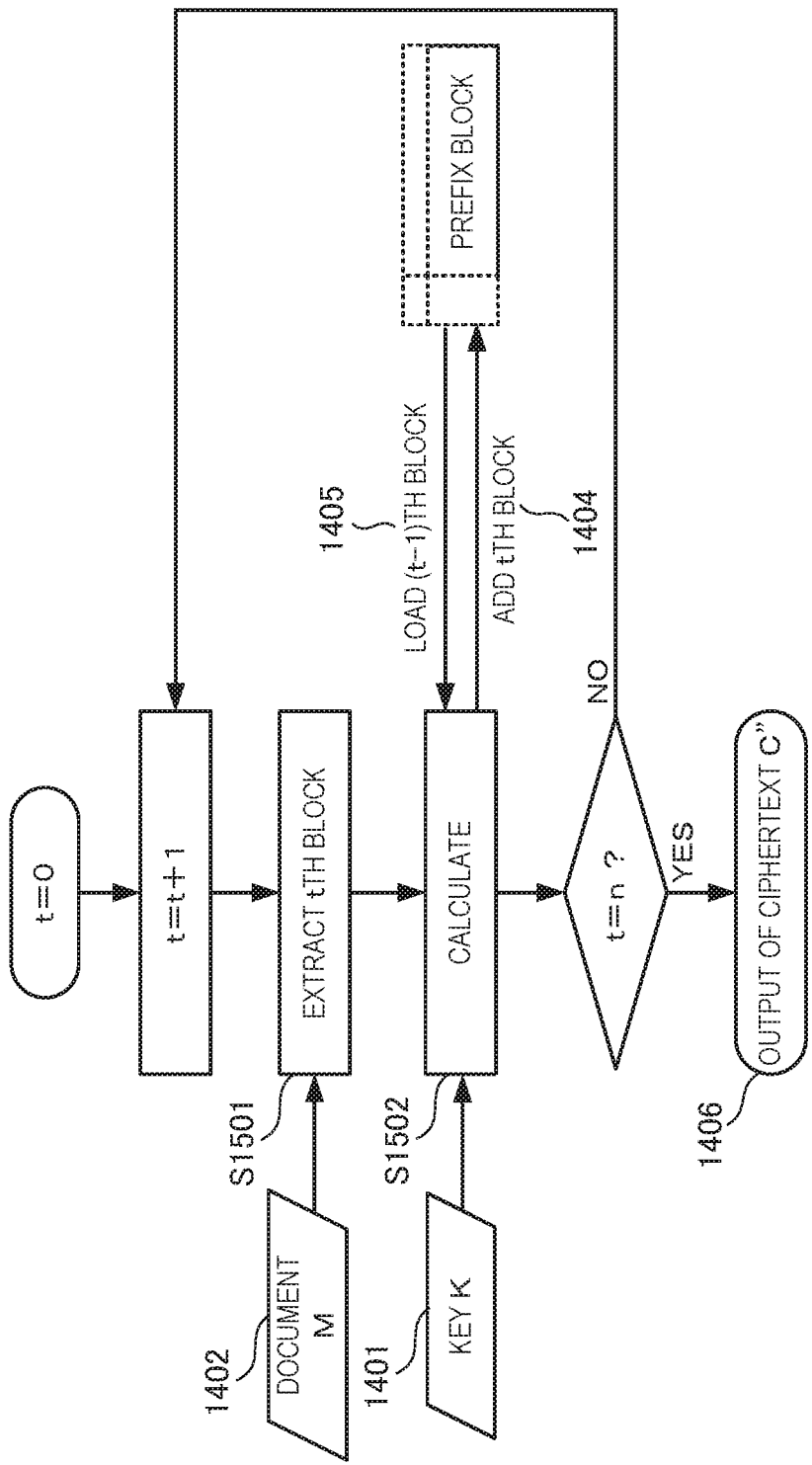
FIG. 15 is a flowchart illustrating the processing procedure of the encryption apparatus according to the technical premise of the present invention.

FIG. 14 is a block diagram showing the arrangement of an encryption apparatus 1410 according to the technical premise. FIG. 15 is a flowchart illustrating the processing procedure of the encryption apparatus 1410 according to the technical premise.

When a key K 1401 and M=(b[1], ..., b[n]) of a document M 1402 as a plaintext are provided, a ciphertext C" 1406 is generated as follows. Note that C[0]=0. For t=n, b[t] 1403 is selected (S1501), and used together with the key K 1401 and a (t−1)th block c[t−1] 1405 of the ciphertext to calculate a t-th block element c[t] 1404 of the ciphertext by c[t]=Hash(K, (c[t−1], b[t])) by recursively using a deriving unit 1411 implemented by a hash function or the like (S1502). The ciphertext C" 1406 is represented by C" (c[1], ..., c[n]). The first k block elements=(c[1], ..., c[k]) of the ciphertext C" are referred to as k prefix block elements of the ciphertext C", and represented by C"[k]. In this case, if two plaintexts match each other with respect to the first k block elements, the ciphertexts of the plaintexts also match each other with respect to the first k block elements. It is thus possible to determine that the plaintexts partially match each other in the ciphertext form. Note that if two plaintexts match each other with respect to the first k block elements for a given k, this is expressed as "there are matching prefixes" or "k prefixes match".

When the orders of ciphertexts are compared using this cryptography, if all ciphertexts in each of which a number smaller than a given numerical value a is encrypted are desirably selected from a set of a plurality of ciphertexts without decrypting the ciphertexts, the following processing is performed. For a given k, P(a) represents a set of k prefix block elements C"[k] of the ciphertext C" for which the prefixes of the ciphertext of a number smaller than the numerical value a match k prefixes of the ciphertext to be compared but the prefixes of the ciphertext of a number larger than the numerical value a do not match the k prefixes of the ciphertext to be compared. The size of this set is smaller than the number of numbers smaller than the numerical value a. If a device holding a key generates P(a), and transfers it to a device holding a set of a plurality of ciphertexts, the latter device can select a ciphertext, in which a number smaller than the numerical value a is encrypted, from the set of ciphertexts without decrypting the ciphertexts.

(Problem of Technical Premise)

In the technical premise, however, even if it is possible to know that ciphertexts match each other with respect to the first k block elements, it is impossible to directly determine magnitudes. It is thus necessary to send all candidate ciphertexts which match with respect to the first k block elements. It is possible to directly determine whether two ciphertexts match each other with respect to the first k block elements even if no key for encryption is held. Therefore, if this is used for a database, the risk of information leakage from the database increases.

In cryptography according to the following embodiment, if a sequence of encrypted numerical values is provided, their magnitudes cannot be compared using only these numerical values. However, if a corresponding comparison request sentence is used with respect to the ciphertext of a given numerical value, it is possible to compare the magnitude of this encrypted numerical value with that of the encrypted numerical value in the sequence.

<<Definitions of Functions and Variables Used in Embodiment>>

Functions and variables used in this embodiment will be defined first. All documents are respectively assigned with identifiers. A pair of an identifier and a document is represented by (ID, M). The document M can be binarized, and written by M=(b[0], b[1], ..., b[n−1]) using b[i]∈{0, 1} that satisfies $M=\Sigma_{i=0}^{n-1} b[i] \times 2^i$ where n represents the bit length of the document M. Let k be a safety variable.

Hash functions Hash, Hash3, and Hash2 used in this embodiment are defined as Hash: $\{0, 1\}^* \to \{0, 1\}^k$, Hash3: $\{0, 1\}^* \to \{0, 1, 2\}$, Hash2: $\{0, 1\}^* \to \{0, 1\}$.

Furthermore, K∈$\{0, 1\}^k$ represents the main key. Assume that a safety variable L[p]∈natural number is defined for each p=n−1.

<<Ciphertext Comparison System>>

A ciphertext generation apparatus 210 according to this embodiment will be described with reference to FIGS. 2A and 2B.

(System Configuration)

Figure 2A:
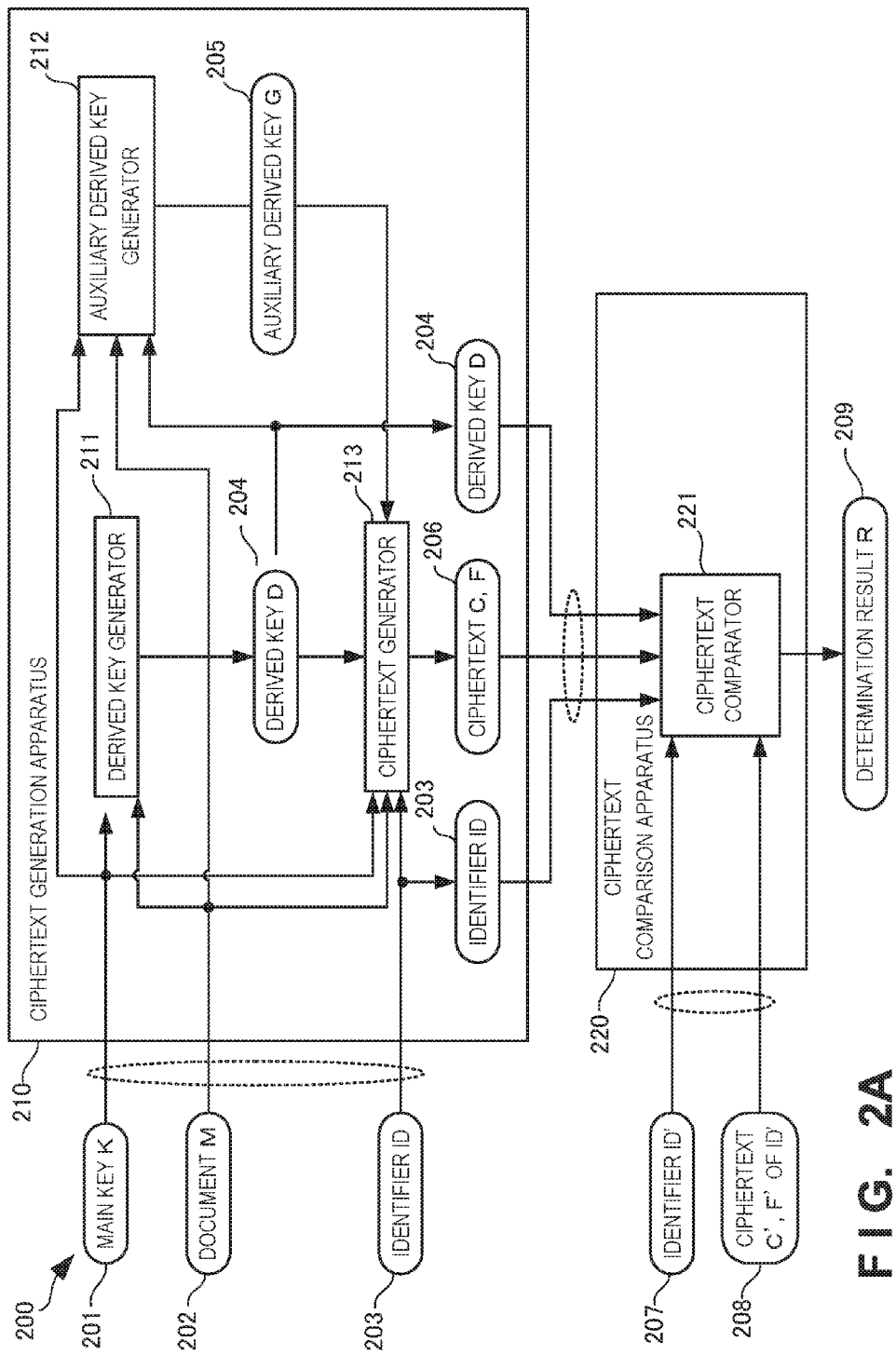
FIG. 2A is a block diagram showing the configuration of a ciphertext comparison system including a ciphertext generation apparatus according to the second embodiment of the present invention.

FIG. 2A is a block diagram showing the configuration of a ciphertext comparison system 200 including the ciphertext generation apparatus 210 according to this embodiment. The ciphertext comparison system 200 includes the ciphertext generation apparatus 210 and a ciphertext comparison apparatus 220.

The ciphertext generation apparatus 210 includes a derived key generator 211, an auxiliary derived key generator 212, and a ciphertext generator 213. The derived key generator 211 generates a derived key D 204 based on a main key K 201 and a document M 202. The auxiliary derived key generator 212 generates an auxiliary derived key G 205 based on the main key K 201, the document M 202, and the derived key D 204. The ciphertext generator 213 generates a ciphertext C, F 206 based on the main key K 201, the document M 202, the derived key D 204, the auxiliary derived key G 205, and an identifier ID 203. Note that the identifier ID 203 is the identifier of the document M 202.

The ciphertext generation apparatus 210 notifies the ciphertext comparison apparatus 220 of the identifier ID 203, the ciphertext C, F 206, and the derived key D 204. Note that the ciphertext generation apparatus 210 and the ciphertext comparison apparatus 220 may be connected by a communication line or may be an integrated apparatus. The communication line may be wireless or wired.

The ciphertext comparison apparatus 220 includes a ciphertext comparator 221. The ciphertext comparator 221 acquires the identifier ID 203 of the document M 202, the ciphertext C, F 206, and the derived key D 204 from the ciphertext generation apparatus 210. Based on the identifier ID 203, the ciphertext C, F 206, the derived key D 204, an identifier ID' 207 of another document M', and a ciphertext C', F' 208 of the document M', the ciphertext comparator 221 compares the magnitudes of the documents M and M' in the ciphertext form. The ciphertext comparator 221 outputs a determination result R 209 of the ciphertext comparator 221.

(Service Applied with Ciphertext Comparison System)

Figure 2B:
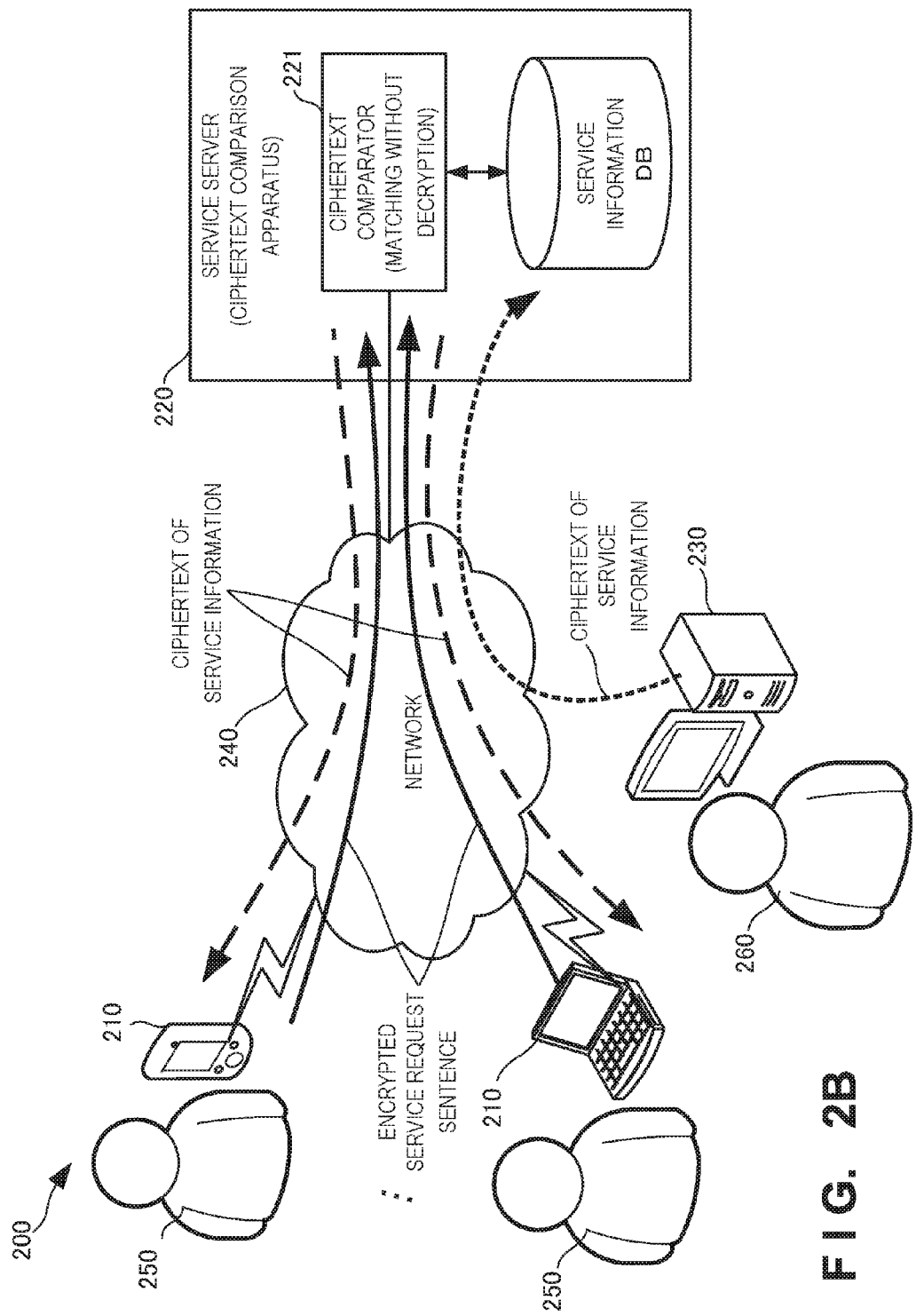
FIG. 2B is a view showing a service applied with the ciphertext comparison system including the ciphertext generation apparatus according to the second embodiment of the present invention.

FIG. 2B is a view showing a service applied with the ciphertext comparison system 200 including the ciphertext generation apparatus 210 according to this embodiment. Note that FIG. 2B shows an example in which when each communication terminal serving as the ciphertext generation apparatus 210 requests, by a ciphertext, a service held by a service server serving as the ciphertext comparison apparatus 220, the service server searches for the requested service by performing comparison in the ciphertext form, and responds.

The ciphertext comparison system 200 includes a plurality of communication terminals serving as the ciphertext generation apparatuses 210 connected via a network 240 and the service server serving as the ciphertext comparison apparatus 220. The ciphertext comparison system 200 may include a service information providing server 230 that provides service information stored in the service information database (to be referred to as a DB hereinafter) of the service server, as indicated by a fine broken line.

Each of the plurality of communication terminals serving as the ciphertext generation apparatuses 210 transmits, to the service server, the ciphertext of a service request sentence obtained by performing encryption according to this embodiment using the main key, as indicated by solid arrows. The ciphertext of the service request sentence contains personal information which is desired by each service user 250 not to be leaked. The ciphertext comparator 221 of the service server serving as the ciphertext comparison apparatus 220 performs a search by comparing the ciphertext of the service request sentence containing the personal information acquired from the service user 250 with service information encrypted by the same cryptography in the service information DB. The ciphertext of the found service information is transmitted to the plurality of communication terminals serving as the ciphertext generation apparatuses 210, as indicated by a broken arrow. The ciphertext of the service information is decrypted using the main key, and the service information is provided to the service users 250.

As described above, by applying this embodiment, a search is executed by performing comparison in the ciphertext form, thereby eliminating the risk of leakage of personal information.

Note that an application example of this embodiment is not limited to that shown in FIG. 2B. For example, encryption information registered in advance in the service server by each service user 250 is also used in the ciphertext form for a data search from the database and determination of reception information, thereby eliminating the risk of information leakage. Consequently, the user can register personal information in the service server also serving as a cloud server without anxiety.

<<Functional Arrangement of Ciphertext Generation Apparatus>>

The functional arrangements of the respective components of the ciphertext generation apparatus 210 according to this embodiment will be sequentially described with reference to FIGS. 3 to 5B.

(Derived Key Generator)

Figure 3:
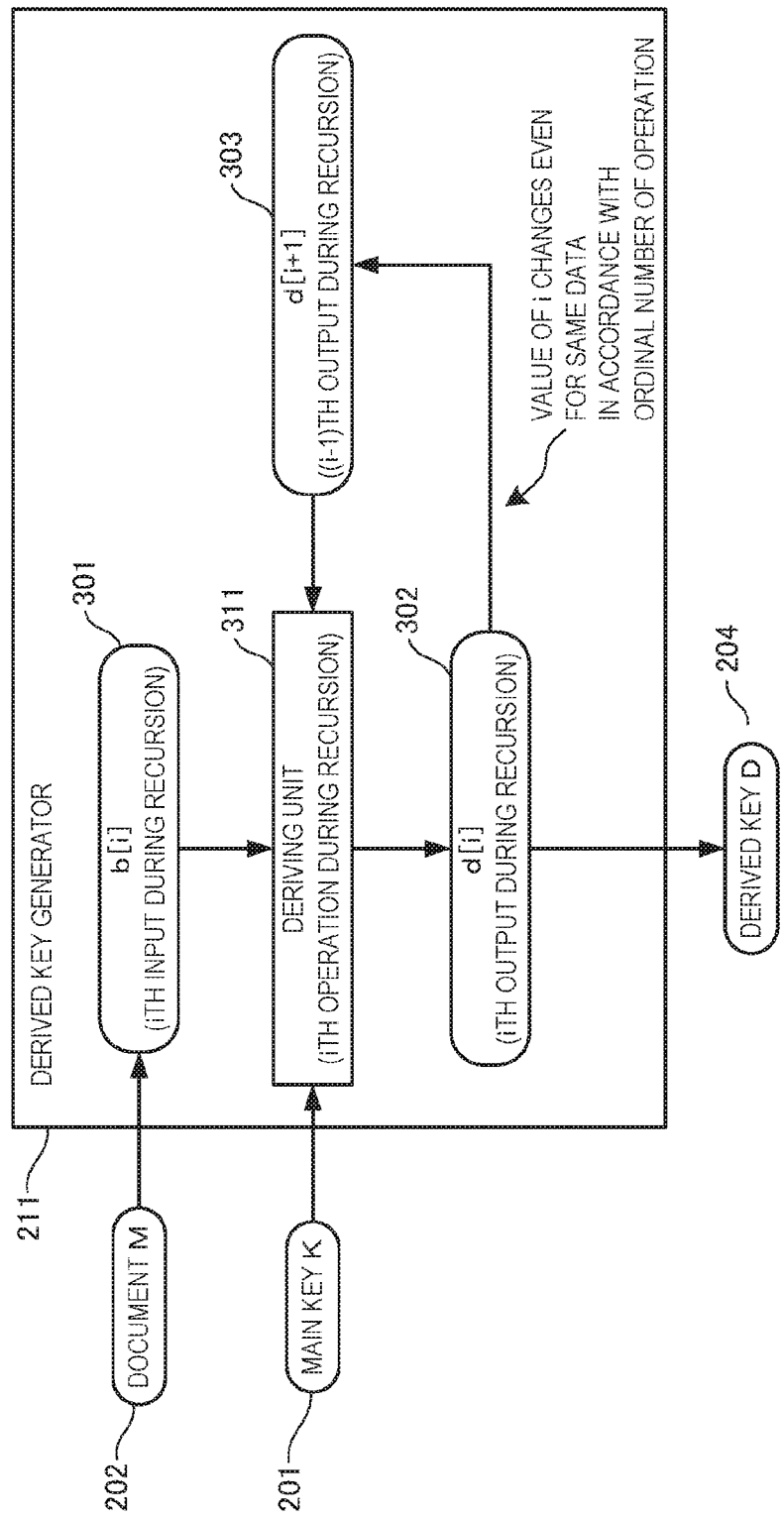
FIG. 3 is a block diagram showing the arrangement of the derived key generator of the ciphertext generation apparatus according to the second embodiment of the present invention.

FIG. 3 is a block diagram showing the functional arrangement of the derived key generator 211 of the ciphertext generation apparatus 210 according to this embodiment. The derived key generator 211 generates a derived key based on the main key and the document.

The derived key generator 211 includes a deriving unit 311. The operation of the deriving unit 311 is as follows. If the main key K 201 and M=(b[0], . . . , b[n−1]) of the document M 202 are provided for each block, the derived key D 204 is generated as follows. An element d[n]=K is set as an initial value. An element b[i] 301 is selected in descending order of a counter i=n−1, . . . , 0, and used together with the main key K 201 and an element d[i+1] 303 of the derived key D to generate an element d[i] 302 of the derived key D by d[i]=Hash(K, (d[i+1], b[i])) by recursively using the deriving unit 311. As a result of repeating the above processing, the derived key D 204 is obtained as D=(d[0], d[1], . . . , d[n−1]).

(Auxiliary Derived Key Generator)

Figure 4:
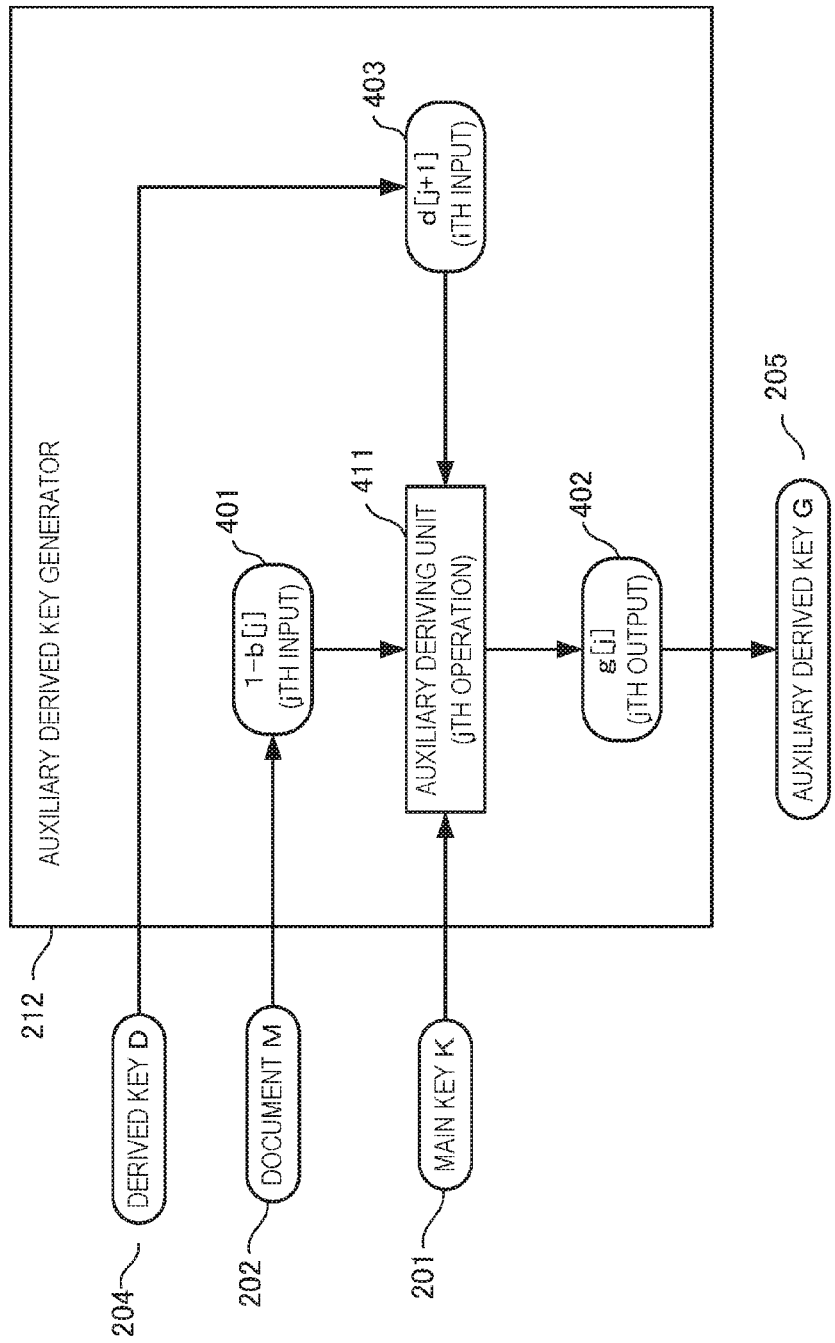
FIG. 4 is a block diagram showing the arrangement of the auxiliary derived key generator of the ciphertext generation apparatus according to the second embodiment of the present invention.

FIG. 4 is a block diagram showing the functional arrangement of the auxiliary derived key generator 212 of the ciphertext generation apparatus 210 according to this embodiment. The auxiliary derived key generator 212 generates an auxiliary derived key based on the main key, the document, and the derived key.

The auxiliary derived key generator 212 includes an auxiliary deriving unit 411. The operation of the auxiliary deriving unit 411 is as follows. If the main key K 201, M=(b[0], . . . , b[n−1]) of the document M 202, and D=(d[0], d[1], . . . , d[n−1]) of the derived key D 204 are provided, the auxiliary derived key G is generated as follows. In ascending order of a counter j=0, . . . , n−1, a j-th element g[j] 402 of the auxiliary derived key G is generated by g[i]=Hash(K, d[j+1], 1−b[j]) using the main key K 201, a (j+1)th element d[j+1] 403 of the derived key D, and 1−b[j] 401 as a result of bit inversion of the j-th element b[j] of the document M. The auxiliary derived key G is obtained as G=(g[0], g[1], . . . , g[n−1]).

(Ciphertext Generator)

FIG. 5A is a block diagram showing the functional arrangement of the ciphertext generator 213 of the ciphertext generation apparatus 210 according to this embodiment.

The ciphertext generator 213 includes a relative value generator 511, an identifier-specific ciphertext generator 512, and a relative value concealer 513. The relative value generator 511 and the relative value concealer 513 form a relative value ciphertext generator. Based on the identifier and derived key, the relative value ciphertext generator generates a relative value ciphertext in which a relative value generated from the main key, document, and derived key is encrypted.

The relative value generator 511 repeats relative value generation processing in ascending order of a counter q=n−1, thereby generating elements e[q] 501 of the relative value by e[q]=Hash3(0, K, d[q+1])+b[q] mod 3 using the main key K 201, the document M 202, and the derived key D. The relative value concealer 513 repeats relative value concealment processing for the counter q=n−1 by setting d[n]=K, thereby generating elements f[q] of the relative ciphertext by f[q]=Hash3(1, ID, d[q+1])+e[q] mod 3 using the identifier ID 203, the derived key D 204, and the elements e[q] 501 of the relative value. A relative value ciphertext F 503 is defined by F=(f[0], . . . , f[n−1]).

Based on the identifier of the document, the derived key, and the auxiliary derived key, the identifier-specific ciphertext generator 512 generates an identifier-specific ciphertext in which the identifier is encrypted. That is, the identifier-specific ciphertext generator 512 generates an identifier-specific ciphertext C 502 as C=(c[0], . . . , c[n−1]) using the identifier ID 203, the derived key D, and the auxiliary derived key G in descending order of a counter p=n−1, . . . , 0.

The relative value generator 511 then outputs the ciphertext C, F 206 as C, F=((c[0], . . . , c[n−1], (f[0], . . . , f[n−1])).

(Identifier-Specific Ciphertext Generator)

FIG. 5B is a block diagram showing the functional arrangement of the identifier-specific ciphertext generator 512 according to this embodiment.

The identifier-specific ciphertext generator 512 includes an identifier-specific ciphertext abnormal candidate generator 521, a derived key positive tester 522, and an auxiliary derived key negative tester 523. The identifier-specific ciphertext generator 512 generates the identifier-specific ciphertext C 502 as follows. The identifier-specific ciphertext abnormal candidate generator 521 randomly selects a candidate of an element c[p] from $\{0, 1\}^{L[p]}$ for the counter p=n−1, . . . , 0. It is confirmed that the candidate passes the following two tests. If the randomly selected element c[p] has not passed at least one of the tests, it is discarded, and a new candidate is randomly reselected. If the candidate has passed both the tests, it is adopted as the element c[p]. As a derived key positive test, the derived key positive tester 522 tests, using the identifier ID and the derived key D, that 0=Hash2(ID, d[p], c[p]) mod 2 holds. As an auxiliary derived key negative test, the auxiliary derived key negative tester 523 tests, using the identifier ID and the auxiliary derived key G, that 1=Hash2(ID, g[p], c[p]) mod 2 holds.

<<Functional Arrangement of Ciphertext Comparison Apparatus>>

Figure 6:
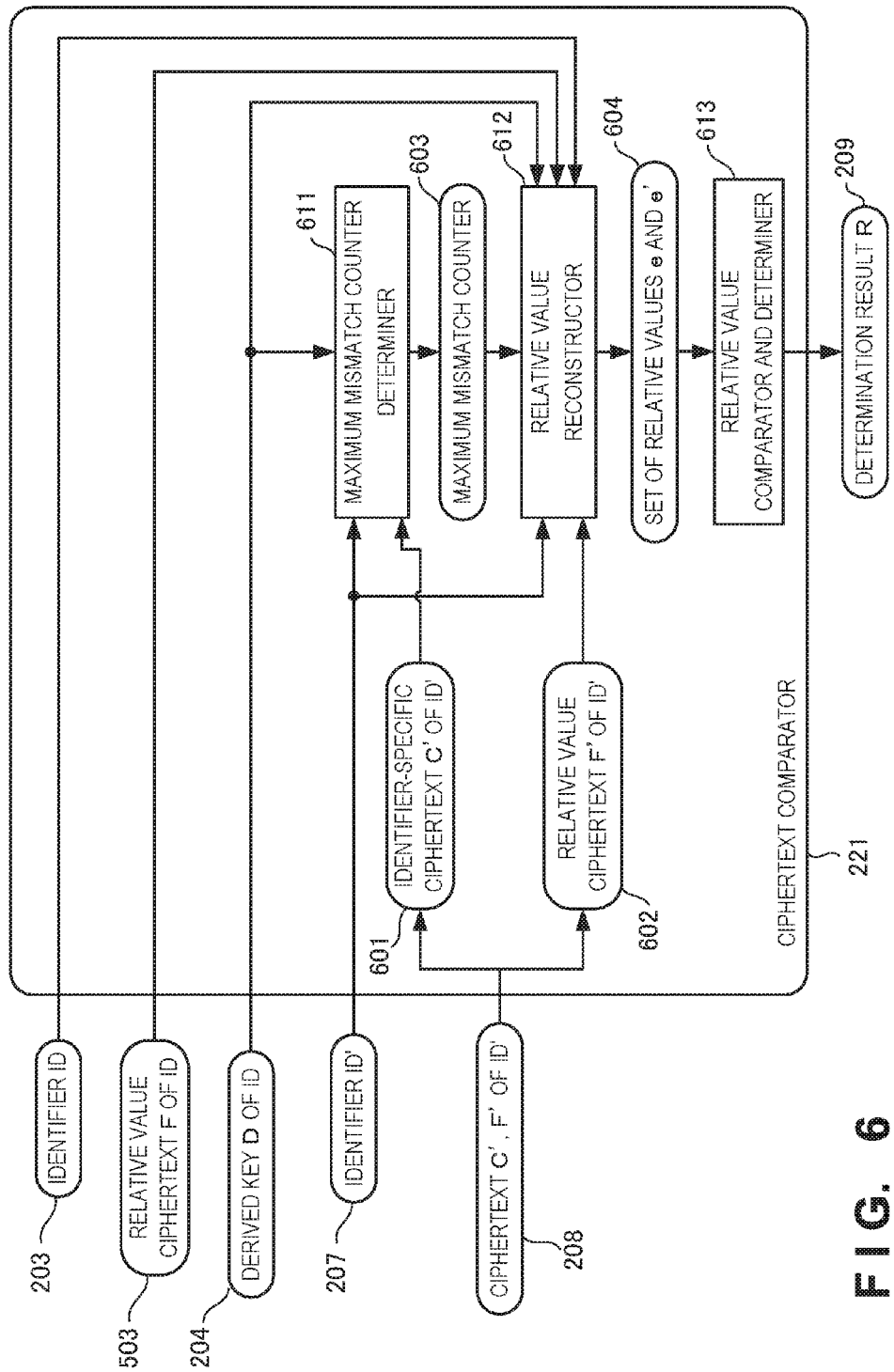
FIG. 6 is a block diagram showing the arrangement of the ciphertext comparator of a ciphertext comparison apparatus according to the second embodiment of the present invention.

FIG. 6 is a block diagram showing the functional arrangement of the ciphertext comparator 221 of the ciphertext comparison apparatus 220 according to this embodiment.

Although not shown, the ciphertext comparison apparatus 220 includes the first ciphertext acquirer that acquires the first ciphertext encrypted by the ciphertext generation apparatus 210, the first identifier, and the first derived key. Although not shown, the ciphertext comparison apparatus 220 also includes the second ciphertext acquirer that acquires the second identifier and the second ciphertext encrypted by an apparatus having the same encryption function as that of the ciphertext generation apparatus 210. The ciphertext comparison apparatus 220 further includes the ciphertext comparator 221 that determines the magnitude relationship between the first document as the original of the first ciphertext and the second document as the original of the second ciphertext in the ciphertext form using the first ciphertext, the first identifier, the first derived key, the second ciphertext, and the second identifier.

An example of comparing the following ciphertexts will be described with reference to FIG. 6. From the document of the identifier ID 203, the identifier ID 203, the relative value ciphertext F=(f[0], . . . , f[n−1]) of the ciphertext C, F=((c[0], . . . , c[n−1]), (f[0], . . . , f[n−1])), and the derived key D 204=(d[0], d[1], . . . , d[n−1]), which have been generated by the ciphertext generation method according to this embodiment, are used. From the document of the identifier ID' 207 to be compared, the identifier ID' 207 and the ciphertext C', F'=((c'[0], . . . , c'[n−1]), (f'[0], . . . , f'[n−1])), which have been generated by the ciphertext generation method according to this embodiment, are used.

The ciphertext comparator 221 includes a maximum mismatch counter determiner 611, a relative value reconstructor 612, and a relative value comparator and determiner 613.

Using the identifier ID' 207, the derived key D 204 of the identifier ID, and an identifier-specific ciphertext C' 601 of the identifier ID', the maximum mismatch counter determiner 611 confirms, in descending order of a counter r=n−1, . . . , 0, whether an equation 0=Hash(ID', d[r], c'[r]) holds. The counter r when this equation does not hold for the first time is set as a maximum mismatch counter r 603.

With respect to e and e' which satisfy e, e'∈{0, 1, 2} for the maximum mismatch counter r, using the identifier ID 203, the relative value ciphertext F 503 of the identifier ID, the identifier ID', and a relative value ciphertext F' 602 of the identifier ID', the relative value reconstructor 612 confirms whether f[r]=Hash3(1, ID, d[r+1])+e mod 3 f[r]=Hash3(1, ID', d[r+1])+e' mod 3 holds. A set 604 of relative values e and e' is generated when the equation holds.

If e−e'=(1 mod 3) for the set of e and e', the relative value comparator and determiner 613 outputs, as the determination result R 209, a signal (for example, "0") representing that the document of the identifier ID is larger than that of the identifier ID'. On the other hand, if e−e'=(2 mod 3), the relative value comparator and determiner 613 outputs, as the determination result R 209, a signal (for example, "1") representing that the document of the identifier ID' is larger than that of the identifier ID.

<<Hardware Arrangement of Ciphertext Generation Apparatus>>

Figure 7:
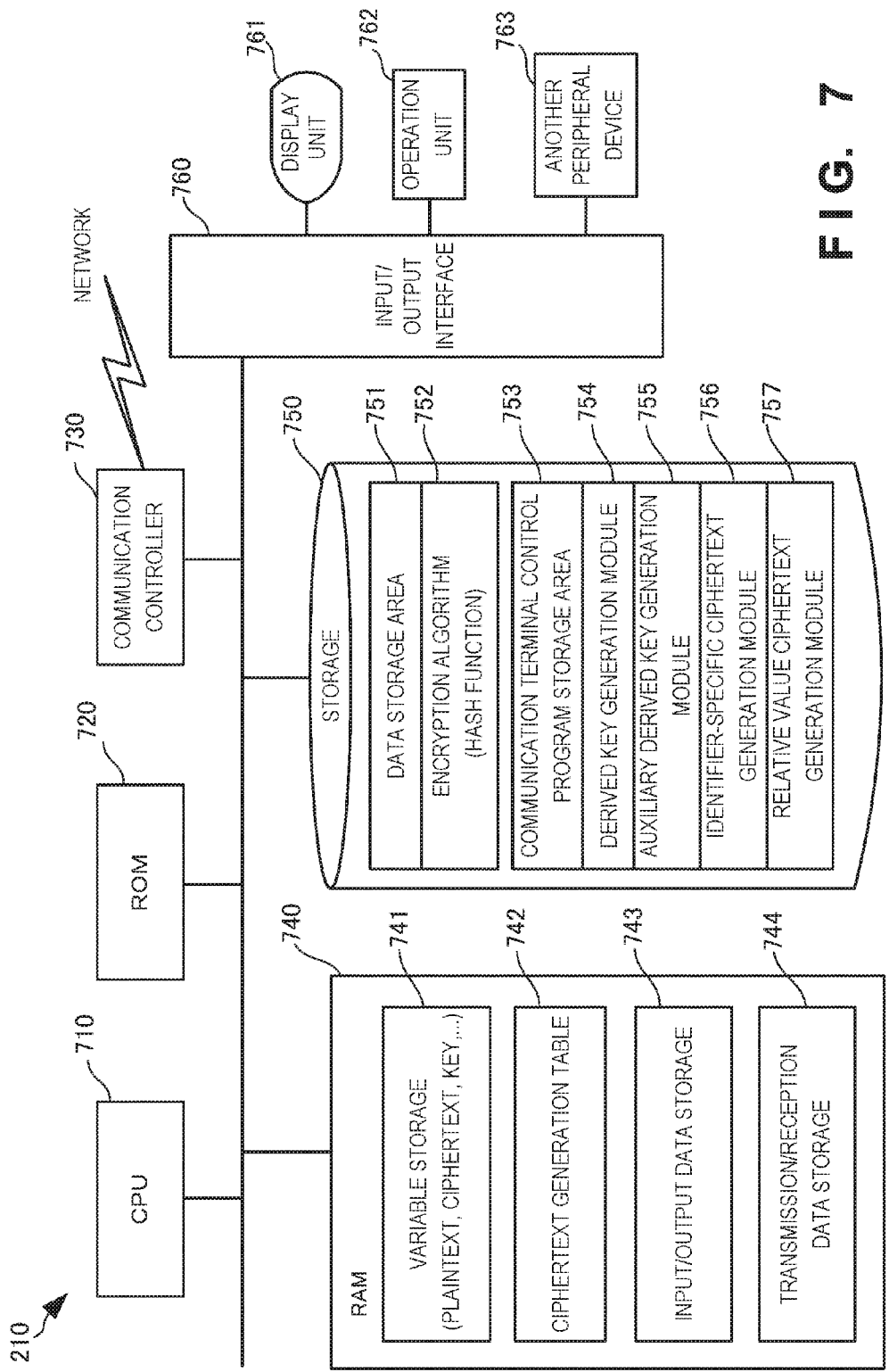
FIG. 7 is a block diagram showing the hardware arrangement of the ciphertext generation apparatus according to the second embodiment of the present invention.

FIG. 7 is a block diagram showing the hardware arrangement of the ciphertext generation apparatus 210 according to this embodiment.

Referring to FIG. 7, a CPU 710 is an arithmetic control processor, and implements the functional components of the ciphertext generation apparatus 210 shown in FIG. 2A by executing programs. A ROM 720 stores programs and permanent data such as initial data and programs. A communication controller 730 communicates with the service server serving as the ciphertext comparison apparatus 220 via the network. Note that the number of CPUs 710 is not limited to one, and a plurality of CPUs or a GPU for image processing may be included.

A RAM 740 is a random access memory used by the CPU 710 as a work area for temporary storage. An area to store data necessary for implementation of the embodiment is allocated to the RAM 740. A variable storage 741 is a temporary storage for storing a document of a plaintext or a ciphertext to be processed by the CPU 710, a key, counters i and j, or the like. A ciphertext generation table 742 is a table to be used to generate a ciphertext according to this embodiment from data and parameters in the variable storage 741. An input/output data storage 743 stores input/output data input/output via an input/output interface 760. A transmission/reception data storage 744 stores transmission/reception data transmitted/received via the communication controller 730.

A storage 750 stores a database, various parameters, or the following data or programs necessary for implementation of the embodiment. A data storage area 751 stores data necessary for the processing of the communication terminal serving as the ciphertext generation apparatus 210 according to this embodiment. The data storage area 751 stores an encryption algorithm 752 according to this embodiment. The encryption algorithm 752 includes hash functions such as Hash, Hash2, and Hash3. The storage 750 stores the following programs. A communication terminal control program storage area 753 stores a communication terminal control program. A derived key generation module 754 is a module for generating a derived key using a main key and a document to be encrypted. An auxiliary derived key generation module 755 is a module for generating an auxiliary derived key using the main key, the document to be encrypted and the derived key. An identifier-specific ciphertext generation module 756 is a module for generating an identifier-specific ciphertext using the derived key, the auxiliary derived key, and the identifier of the document. A relative value ciphertext generation module 757 is a module for generating a relative value ciphertext using the main key, the document to be encrypted, the derived key, the auxiliary derived key, and the identifier of the document.

The input/output interface 760 interfaces input/output data with an input/output device. The input/output interface 760 is connected to a display unit 761, an operation unit 762 such as a keyboard, touch panel, and pointing device, and another peripheral device 763 of the communication terminal. The input/output interface 760 can also be connected to a voice input/output unit such as a loudspeaker and microphone, a GPS (Global Positioning System) position generator, a camera, and the like.

Note that in the RAM 740 and storage 750 of FIG. 7, data and programs associated with the general-purpose functions and other feasible functions of the ciphertext generation apparatus are not shown.

(Ciphertext Generation Table)

FIG. 8 is a table showing the structure of the ciphertext generation table 742 according to this embodiment. The ciphertext generation table 742 is used to generate, from a document to be encrypted, a ciphertext to be transmitted to the ciphertext comparison apparatus.

The ciphertext generation table 742 stores the document M 202 and the main key K 201 in association with the identifier ID 203. The ciphertext generation table 742 also stores the derived key D 204 and auxiliary derived key G 205, which have been derived, in association with the identifier ID 203. Furthermore, the ciphertext generation table 742 stores the ciphertext C, F 206 including the encrypted identifier-specific ciphertext C and relative value ciphertext F in association with the identifier ID 203.

<<Processing Procedure of Ciphertext Generation Apparatus>>

Figure 9:
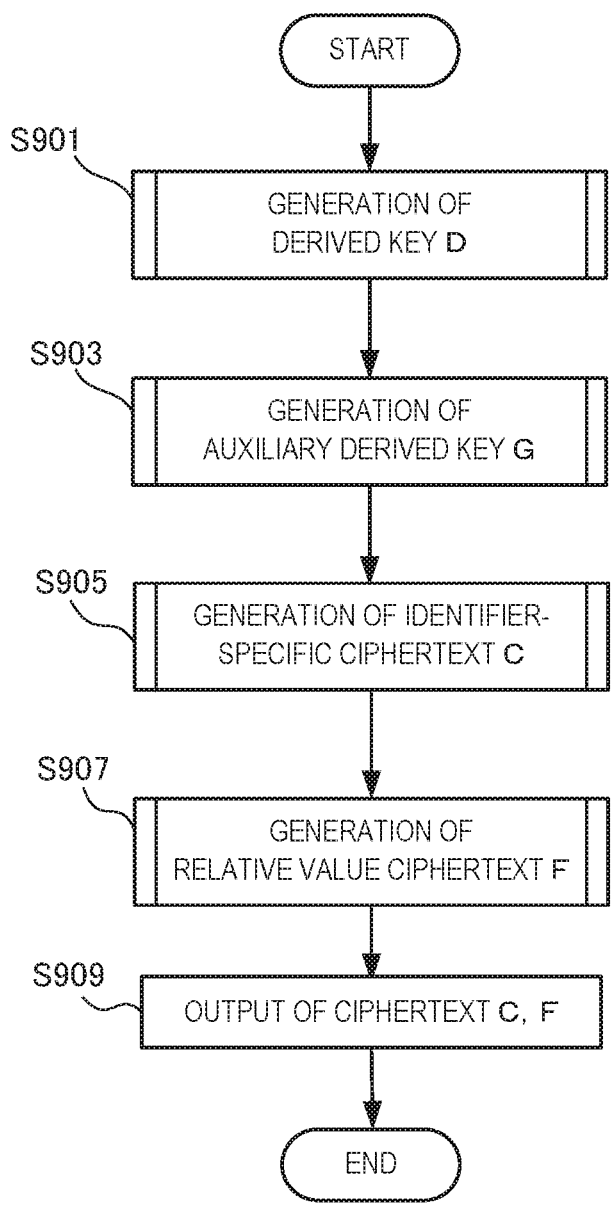
FIG. 9 is a flowchart illustrating the processing procedure of the ciphertext generation apparatus according to the second embodiment of the present invention.

FIG. 9 is a flowchart illustrating the processing procedure of the ciphertext generation apparatus 210 according to this embodiment. This flowchart is executed by the CPU 710 of FIG. 7 using the RAM 740, thereby implementing the functional components of the ciphertext generation apparatus 210 of FIG. 2A. Note that the processing sequence of FIG. 9 is not limited to this.

In step S901, the ciphertext generation apparatus 210 generates the derived key D from the main key and the document to be encrypted. In step S903, the ciphertext generation apparatus 210 generates the auxiliary derived key G from the main key, the document to be encrypted, and the derived key. In step S905, the ciphertext generation apparatus 210 generates the identifier-specific ciphertext C from the identifier of the document to be encrypted, the derived key, and the auxiliary derived key. In step S907, the ciphertext generation apparatus 210 generates the relative value ciphertext F from the main key, the document to be encrypted, the identifier of the document to be encrypted, and the derived key. In step S909, the ciphertext generation apparatus 210 outputs a ciphertext including the identifier-specific ciphertext C and the relative value ciphertext F.

(Derived Key Generation Processing)

Figure 10A:
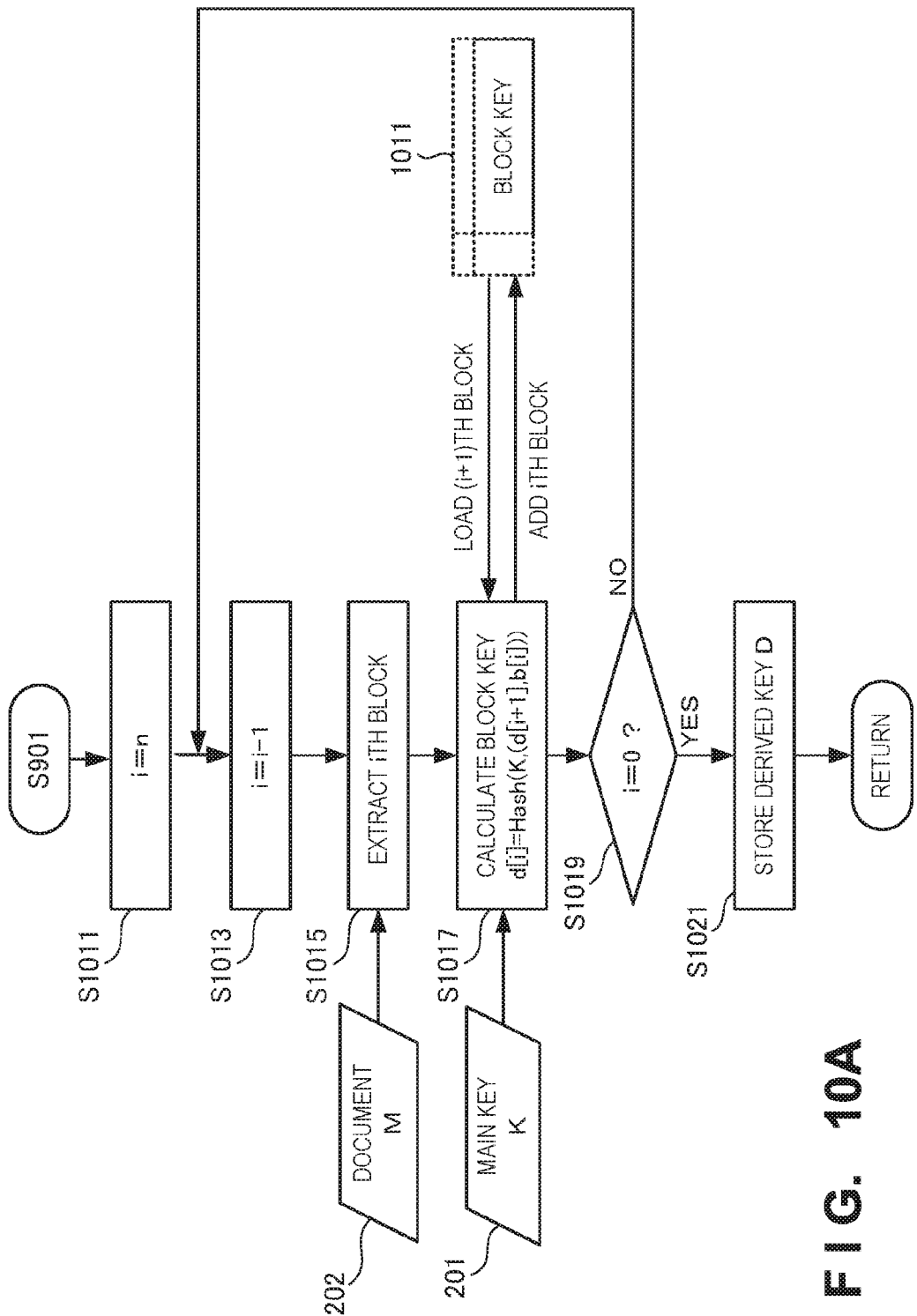
FIG. 10A is a flowchart illustrating the procedure of derived key generation processing according to the second embodiment of the present invention.

FIG. 10A is a flowchart illustrating the procedure of the derived key generation processing (S901) according to this embodiment.

In step S1011, the ciphertext generation apparatus 210 sets the counter i=n to perform a recursive loop in descending order. In step S1013, the ciphertext generation apparatus 210 decrements the counter i by one. In step S1015, the ciphertext generation apparatus 210 extracts the block b[i] from the document M 202. In step S1017, the ciphertext generation apparatus 210 calculates the element d[i] of the derived key by d[i]=Hash(K, (d[i+1], b[i])) using the main key K 201, the immediately preceding element d[i+1] of the derive key stored in a block key 1011, and the element b[i]. The calculated element d[i] of the derived key is stored in the block key 1011. In step S1019, the ciphertext generation apparatus 210 determines whether the counter i=0. Until it is determined that i=0, steps S1013 to S1019 are repeated. If the counter i=0, the ciphertext generation apparatus 210 stores the derived key D=(d[0], d[1], . . . , d[n−1]) in step S1021.

(Auxiliary Derived Key Generation Processing)

Figure 10B:
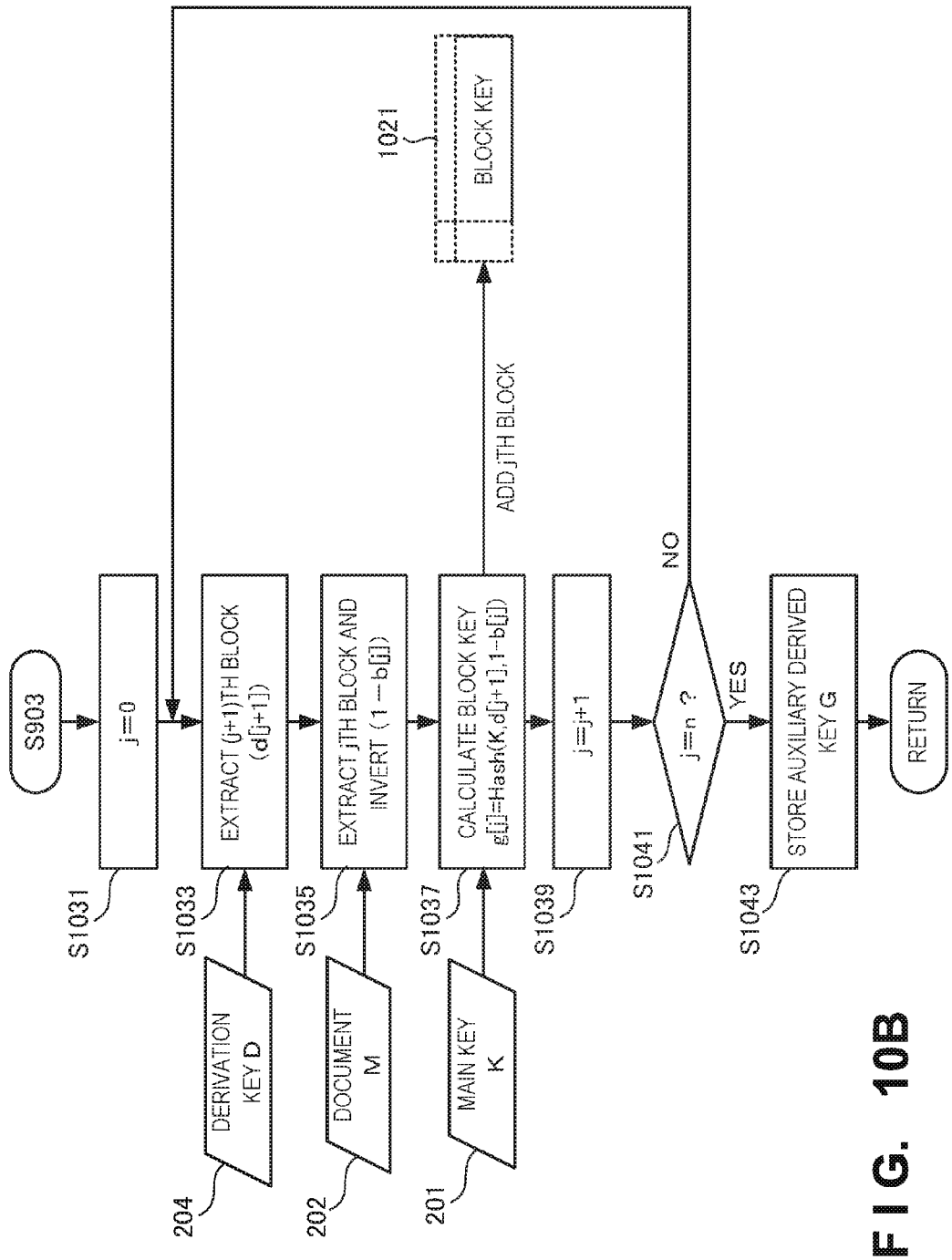
FIG. 10B is a flowchart illustrating the procedure of auxiliary derived key generation processing according to the second embodiment of the present invention.

FIG. 10B is a flowchart illustrating the procedure of the auxiliary derived key generation processing (S903) according to this embodiment.

In step S1031, the ciphertext generation apparatus 210 sets the counter j=0 to perform a recursive loop in ascending order. In step S1033, the ciphertext generation apparatus 210 extracts the element d[j+1] of the derived key D 204. In step S1035, the ciphertext generation apparatus 210 extracts the block element b[j] from the document M 202, and inverts it to 1−b[j]. In step S1037, the ciphertext generation apparatus 210 calculates the element g[j] of the auxiliary derived key by g[j]=Hash(K, d[j+1], 1−b[j]) using the main key K, the element d[i+1] of the derived key, and the inverted block element (1−b[i]). The calculated element g[j] of the auxiliary derived key is stored in a block key 1021. In step S1039, the ciphertext generation apparatus 210 increments the counter j by one. In step S1041, the ciphertext generation apparatus 210 determines whether the counter j=n. Until it is determined that j=n, steps S1033 to S1041 are repeated. If the counter j=n, the ciphertext generation apparatus 210 stores the auxiliary derived key G=(g[0], g[1], . . . , g[n−1]) in step S1043.

(Identifier-Specific Ciphertext Generation Processing)

Figure 10C:
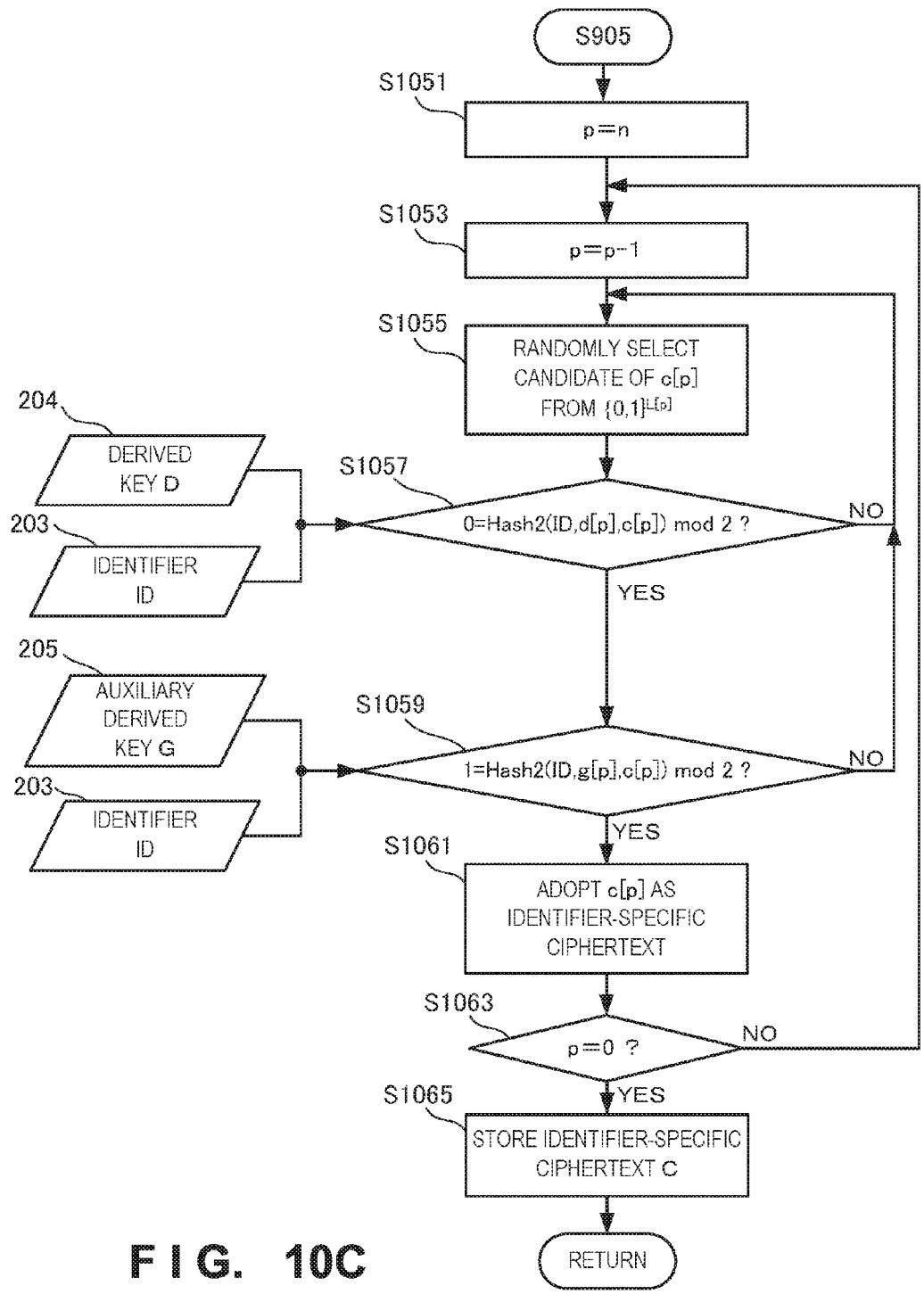
FIG. 10C is a flowchart illustrating the procedure of identifier-specific ciphertext generation processing according to the second embodiment of the present invention.

FIG. 10C is a flowchart illustrating the procedure of the identifier-specific ciphertext generation processing (S905) according to this embodiment.

In step S1051, the ciphertext generation apparatus 210 sets the counter p=n to perform a recursive loop in descending order. In step S1053, the ciphertext generation apparatus 210 decrements the counter p by one. In step S1055, the ciphertext generation apparatus 210 randomly selects a candidate of the element c[p] from $\{0, 1\}^{L[p]}$ by the safety variable (L[p]∈natural number). In step S1057, the ciphertext generation apparatus 210 uses the identifier ID and the derived key D to determine whether the randomly selected element c[p] satisfies the first condition: 0=Hash2(ID, d[p], c[p]) mod 2. If the element c[p] does not satisfy the first condition, the process returns to step S1055 to randomly select another element c[p]; otherwise, the ciphertext generation apparatus 210 uses the identifier ID and the auxiliary derived key G to determine in step S1059 whether the randomly selected element c[p] satisfies the second condition: 1=Hash2(ID, g[p], c[p]) mod 2. If the element c[p] does not satisfy the second condition, the process returns to step S1055 to randomly select another element c[p]; otherwise, the ciphertext generation apparatus 210 adopts the element c[p] as an element of the identifier-specific ciphertext C in step S1061. In step S1063, the ciphertext generation apparatus 210 determines whether the counter p=0. Until it is determined that p=0, steps S1053 to S1063 are repeated. If the counter p=0, the ciphertext generation apparatus 210 stores the identifier-specific ciphertext C=(c[0], c[1], . . . , c[n−1]) in step S1065.

(Relative Value Ciphertext Generation Processing)

Figure 10D:
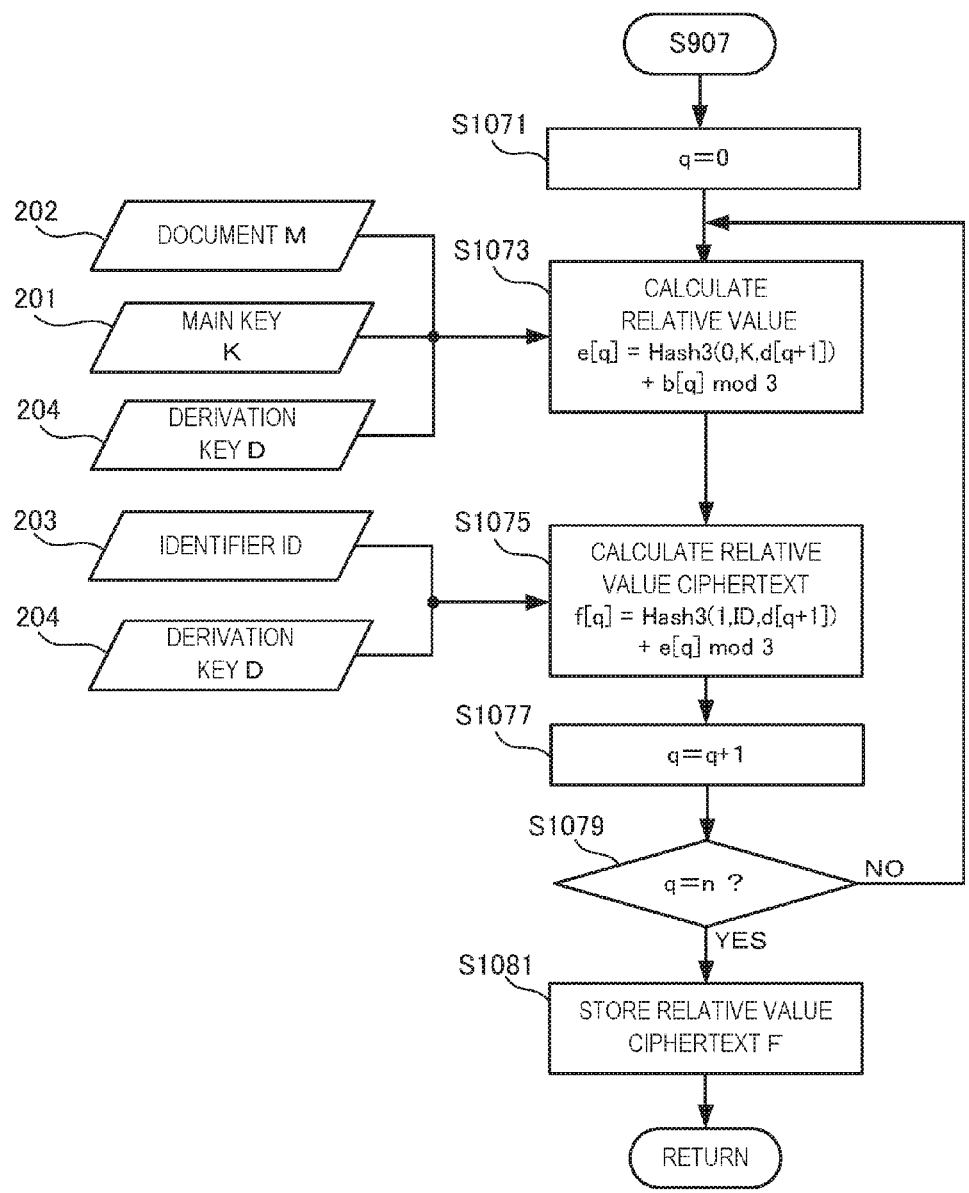
FIG. 10D is a flowchart illustrating the procedure of relative value ciphertext generation processing according to the second embodiment of the present invention.

FIG. 10D is a flowchart illustrating the procedure of the relative value ciphertext generation processing (S907) according to this embodiment.

In step S1071, the ciphertext generation apparatus 210 sets the counter q=0 to perform a recursive loop in ascending order. In step S1073, the ciphertext generation apparatus 210 calculates the element e[q]=Hash3(0, K, d[q+1])+b[q] mod 3 of the relative value using the main key K 201, the derived key D 204, the document M 202 to be encrypted. In step S1075, the ciphertext generation apparatus 210 calculates the element f[i]=Hash3(1, ID, d[q+1])+e[q] mod 3 of the relative value ciphertext F using the identifier ID 203 and the derived key D 204. In step S1077, the ciphertext generation apparatus 210 increments the counter q by one. In step S1079, the ciphertext generation apparatus 210 determines whether the counter q=n. Until it is determined that q=n, steps S1073 to S1079 are repeated. If the counter q=n, the ciphertext generation apparatus 210 stores the relative value ciphertext F=(f[0], f[1], . . . , f[n−1]) in step S1081.

<<Hardware Arrangement of Ciphertext Comparison Apparatus>>

Figure 11:
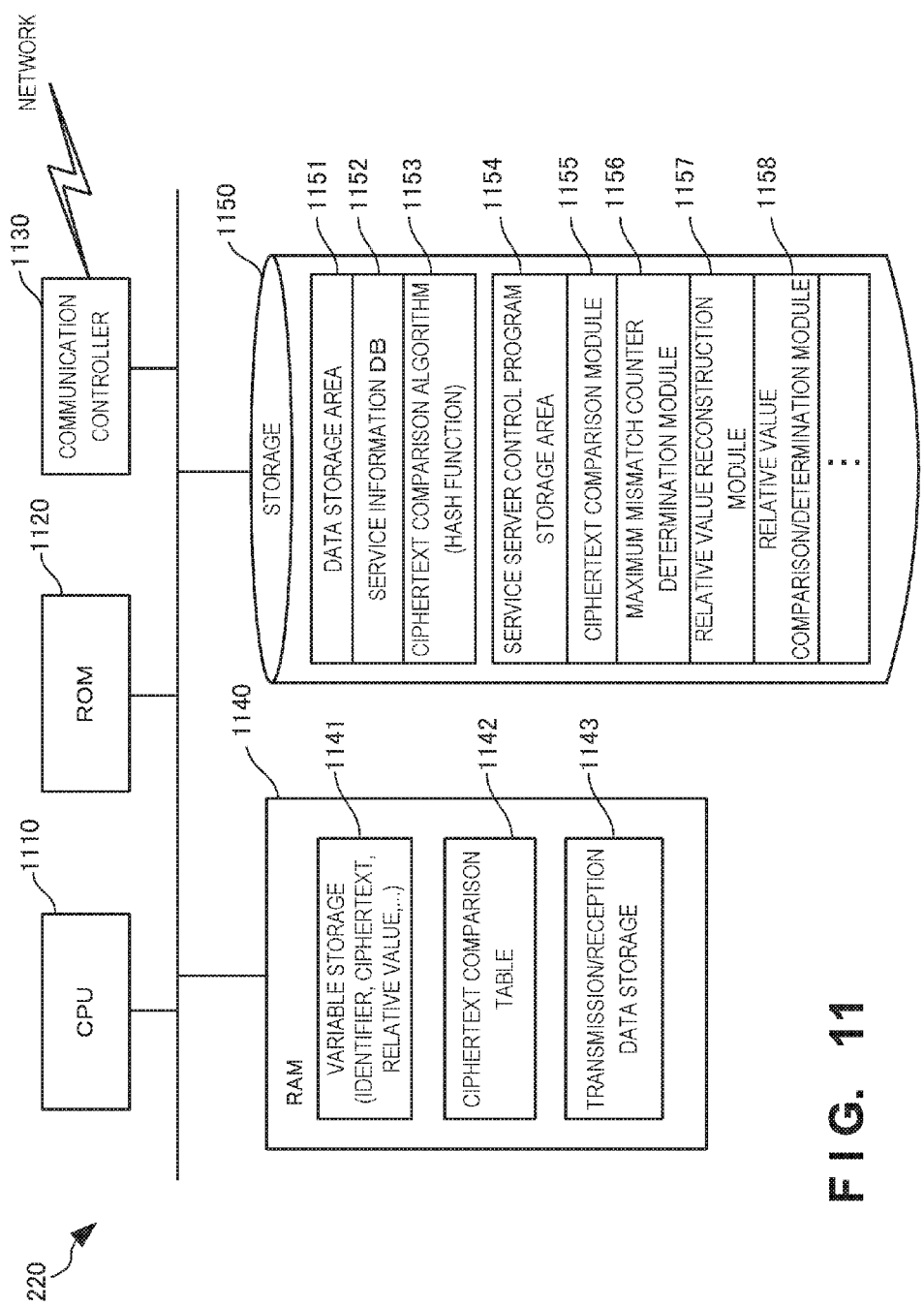
FIG. 11 is a block diagram showing the hardware arrangement of the ciphertext comparison apparatus according to the second embodiment of the present invention.

FIG. 11 is a block diagram showing the hardware arrangement of the ciphertext comparison apparatus 220 according to this embodiment.

Referring to FIG. 11, a CPU 1110 is an arithmetic control processor, and implements the functional components of the ciphertext comparison apparatus 220 shown in FIG. 2A by executing programs. A ROM 1120 stores programs and permanent data such as initial data and programs. A communication controller 1130 communicates with the communication terminal serving as the ciphertext generation apparatus 210 via the network. Note that the number of CPUs 1110 is not limited to one, and a plurality of CPUs or a GPU for image processing may be included.

A RAM 1140 is a random access memory used by the CPU 1110 as a work area for temporary storage. An area to store data necessary for implementation of the embodiment is allocated to the RAM 1140. A variable storage 1141 is a temporary storage for storing a ciphertext to be processed by the CPU 1110, an identifier, a relative value, the counter r, or the like. A ciphertext comparison table 1142 is a table to be used for comparison between ciphertexts according to this embodiment based on data and parameters in the variable storage 1141. A transmission/reception data storage 1143 stores transmission/reception data transmitted/received via the communication controller 1130.

A storage 1150 stores a database, various parameters, or the following data or programs necessary for implementation of the embodiment. A data storage area 1151 stores data necessary for the processing of the service server serving as the ciphertext comparison apparatus 220 according to this embodiment. The data storage area 1151 stores a service information DB 1152 and a ciphertext comparison algorithm 1153 according to this embodiment. The service information DB 1152 stores service information which is searched for in the ciphertext form, and provided. The ciphertext comparison algorithm 1153 includes hash functions such as Hash, Hash2, and Hash3. The storage 1150 stores the following programs. A service server control program storage area 1154 stores a service server control program. A ciphertext comparison module 1155 includes the following three modules. A maximum mismatch counter determination module 1156 is a module for determining, using the derived key D of the identifier ID, the identifier ID', and the identifier-specific ciphertext C' of the identifier ID', a maximum mismatch counter when the equation 0=Hash(ID', d[r], c'[r]) does not hold. A relative value reconstruction module 1157 is a module for reconstructing the set of the relative values e and e' using the identifier ID, the derived key D of the identifier ID, the relative value ciphertext F of the identifier ID, the identifier ID', and the relative value ciphertext F' of the identifier ID'. A relative value comparison/determination module 1158 is a module for comparing the document of the identifier ID with that of the identifier ID' based on the set of the relative values e and e', and determining the magnitude relationship between them in the ciphertext form.

Note that in the RAM 1140 and storage 1150 of FIG. 11, data and programs associated with the general-purpose functions and other feasible functions of the ciphertext comparison apparatus are not shown.

(Ciphertext Comparison Table)

Figure 12:
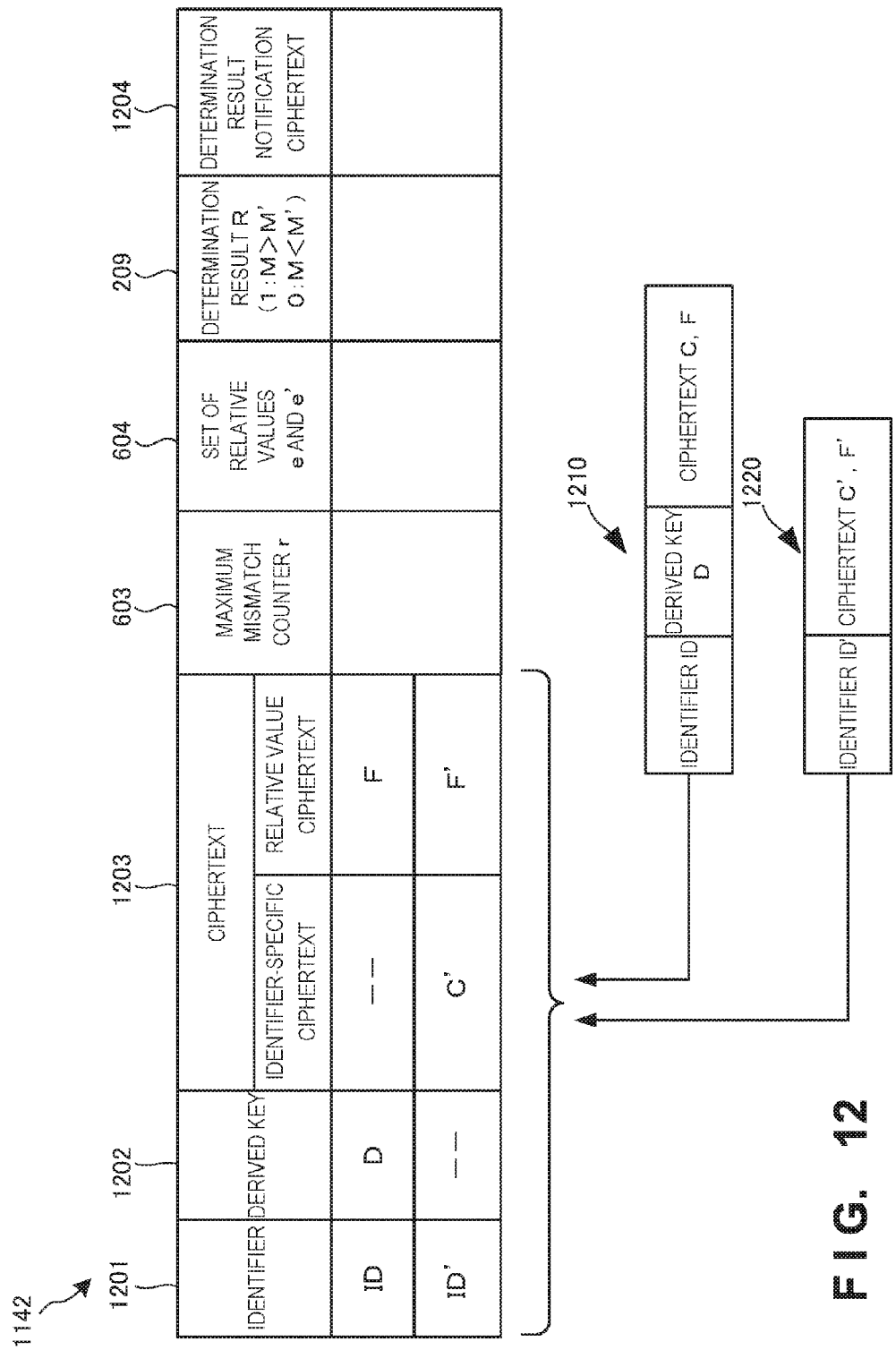
FIG. 12 is a table showing the structure of a ciphertext comparison table according to the second embodiment of the present invention.

FIG. 12 is a table showing the structure of the ciphertext comparison table 1142 according to this embodiment. The ciphertext comparison table 1142 is used to compare the document of the identifier ID and that of the identifier ID' and determine the magnitude relationship between them in the ciphertext form.

The ciphertext comparison table 1142 stores, in association with identifiers 1201 of documents, derived keys 1202 and ciphertexts 1203 each including the identifier-specific ciphertext and relative value ciphertext of the identifier ID or ID', which are used for magnitude determination. The ciphertext comparison table 1142 also stores the maximum mismatch counter r 603, the set 604 of the relative values e and e', and the determination result R 209 in association with the set of the documents to be compared. For example, if it is determined that the document M of the identifier ID is larger than the document M' of the identifier ID', "1" is set in the determination result R 209. If it is determined that the document M' of the identifier ID' is larger than the document M of the identifier ID, "0" is set in the determination result R 209. Note that presentation of the determination result is not limited. Furthermore, the ciphertext comparison table 1142 may store a ciphertext as an obtained comparison result in a determination result notification ciphertext 1204.

Note that FIG. 12 shows a ciphertext 1210 of the identifier ID and a ciphertext 1220 of the identifier ID', which are acquired by the ciphertext comparator 221, since they are used for the ciphertext comparison table 1142.

<<Processing Procedure of Ciphertext Comparison Apparatus>>

Figure 13:
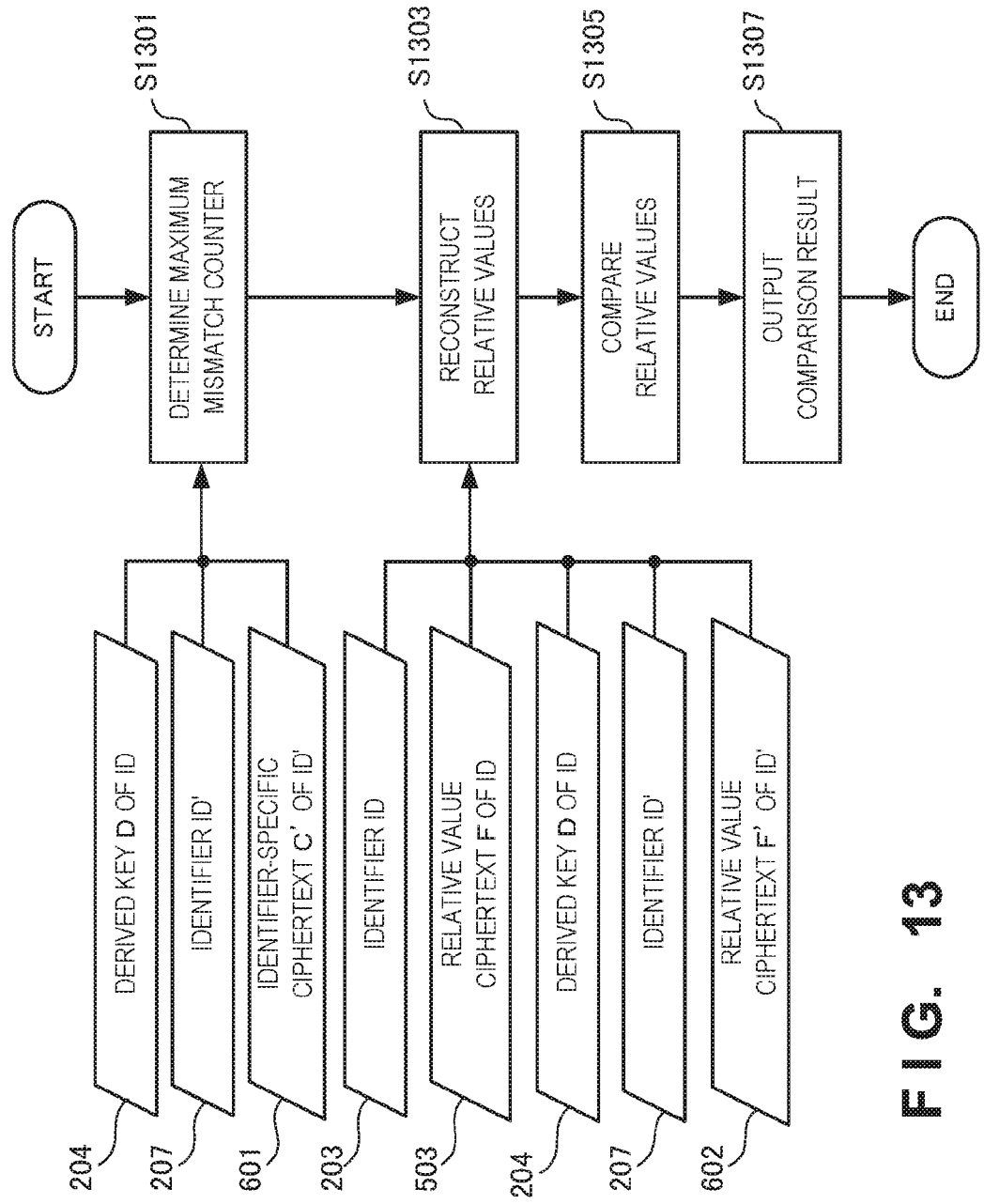
FIG. 13 is a flowchart illustrating the processing procedure of the ciphertext comparison apparatus according to the second embodiment of the present invention.

FIG. 13 is a flowchart illustrating the processing procedure of the ciphertext comparison apparatus 220 according to this embodiment. This flowchart is executed by the CPU 1110 of FIG. 11 using the RAM 1140, thereby implementing the functional components of the ciphertext comparison apparatus 220 of FIG. 2A.

In step S1301, the ciphertext comparison apparatus 220 determines the maximum mismatch counter using the derived key D 204 of the identifier ID, the identifier ID' 207, the identifier-specific ciphertext C' 601 of the identifier ID'. That is, it is confirmed whether the equation 0=Hash(ID', d[r], c'[r]) holds in descending order of the counter r=n−

1, ..., 0. The counter r when this equation does not hold for the first time is set as the maximum mismatch counter.

In step S1303, the ciphertext comparison apparatus 220 reconstructs the relative values using the identifier ID 203, the derived key D 204 of the identifier ID, the relative value ciphertext F 503 of the identifier ID, the identifier ID' 207, and the relative value ciphertext F' 602 of the identifier ID'. That is, with respect to e and e' which satisfy e, e'∈{0, 1, 2} for the maximum mismatch counter r, it is confirmed whether $f[r]=Hash3(1, ID, d[r+1])+e \mod 3 f'[r]=Hash3(1, ID', d[r+1])+e' \mod 3$ holds. A set of the relative values e and e' is generated when the equation holds.

In step S1305, the ciphertext comparison apparatus 220 compares the relative values based on the set of the relative values e and e'. In step S1307, the ciphertext comparison apparatus 220 outputs a comparison result based on comparison between the relative values. That is, if $e-e'=(1 \mod 3)$ with respect to the set of e and e', a signal (for example, "0") indicating that the document of the identifier ID is larger than that of the identifier ID' is output. On the other hand, if $e-e'=(2 \mod 3)$, a signal (for example, "1") indicating that the document of the identifier ID' is larger than that of the identifier ID is output.

According to this embodiment, by generating a derived key and auxiliary derived key and using them to generate a ciphertext, it is possible to compare the magnitudes of encrypted numerical values and largely reduce the risk of information leakage while maintaining the confidentiality.

For example, with an arrangement of generating relative values from documents including numerical data using key information, and reconstructing relative values corresponding to different ciphertexts, it is possible to compare the magnitudes of different encrypted documents while maintaining the confidentiality of the documents.

Furthermore, by generating identifier-specific ciphertexts based on identifiers for specifying documents and adding them to the relative values, different ciphertexts are generated by the different identifiers even if the documents partially match. Therefore, it is possible to compare the magnitudes of the encrypted different documents while maintaining the confidentiality of the documents. That is, according to the two conditions using the derived key and the auxiliary derived key, the identifier-specific ciphertexts based on the identifiers are generated. Thus, it is possible to compare the magnitudes of the different encrypted documents while maintaining the confidentiality of the documents.

More specifically, the following effect can be expected. For example, assume that a set of ciphertexts is provided. All the elements are assigned with different identifiers. Assume also that no main key is provided. Note that "i" and "k" used below do not always coincide with those in the above description of the embodiment.

Under these conditions, if no derived key is provided, a derived key corresponding to any plaintext is unknown, and thus the third party cannot know a plaintext corresponding to each ciphertext. In addition, even if two ciphertexts corresponding to the same plaintext or plaintexts which match each other with respect to prefixes, the prefixes of derived keys corresponding to the ciphertexts match but encryption is performed using different identifiers. Thus, it is impossible to determine whether the plaintexts or the prefixes of the plaintexts match.

However, if a given ciphertext and its corresponding derived key are provided, it can be determined, using the comparison method according to this embodiment, whether plaintexts respectively corresponding to the ciphertext and a given ciphertext match each other with respect to prefixes. That is, if the two plaintexts match each other with respect to the i-th bit and subsequent bits in the derived key positive test, the i-th bit of an identifier-specific ciphertext using the derived key associated with one of the ciphertexts passes the derived key positive test. If the (i+1)th bits and subsequent bits match but the i-th bits do not match, it is ensured that the i-th bit of the identifier-specific ciphertext of one ciphertext (to be referred to as a ciphertext B hereinafter) using the derived key of the other ciphertext (to be referred to as a ciphertext A hereinafter) does not pass the derived key positive test. This is because the result of this test is equal to a value indicating that the i-th bit of the ciphertext B passes the auxiliary derived key negative test using the auxiliary derived key of the ciphertext B. The identifier-specific ciphertext of the ciphertext B is thus generated.

On the other hand, assume that there are the ciphertexts of two plaintexts which match each other with respect to k prefixes, and derived keys corresponding to the ciphertexts are obtained. Since the elements b[i] for the counter i equal to or larger than k match, the elements e[i], d[i], and f[i] also respectively match. However, the elements f[k−1] do not match, and the magnitudes of the two values f[k−1] can be determined. In this case, as an important point, if the two values f[i] do not match, the two values b[i] can be determined based on the values f[i] but if the values f[i] match, the values b[i] cannot be determined based on the values f[i]. That is, it is possible to know a mismatch and the magnitude relationship, that is, the values, at the kth block between the ciphertexts of the two plaintexts which match each other with respect to the k prefixes. However, it is impossible to know the values of the kth blocks and the preceding blocks. Therefore, according to ciphertext generation of this embodiment, even if two ciphertexts corresponding to the same plaintext (document) or plaintexts (documents) which match each other with respect to a prefix portion are provided, derived keys corresponding to the ciphertexts match each other with respect to prefixes but encryption is performed using different identifiers. Therefore, it is possible to perform encryption so as not to determine whether the plaintexts or the prefixes of the plaintexts match.

As described above, according to this embodiment, with respect to a plurality of different encrypted ciphertexts, it is possible to effectively prevent magnitude determination of plaintexts corresponding to the ciphertexts based on character strings included in the ciphertexts. It is thus possible to effectively prevent the third party having no knowledge of the keys of the ciphertexts from checking the magnitude relationship between numerical data as plaintexts.

As described above, according to this embodiment, when ciphertexts obtained by encrypting numerical data are provided, it is possible to prevent comparison of the magnitudes of the original numerical data based on only the ciphertexts. In addition, in this embodiment, if an authorized user requests the database to perform magnitude comparison of corresponding numerical data with respect to the ciphertext of a given numerical value, it is possible to perform magnitude comparison with the original numerical data based on a character string included in a different encrypted ciphertext.

Consequently, in the database system according to this embodiment, a database user can acquire numerical data larger (or smaller) than a specific encrypted numerical value included in a database by preventing an administrator from knowing the numerical data before encryption. Furthermore, in this embodiment, even if character strings (for example, prefix character strings) included in two ciphertexts match each other, it is possible to effectively prevent the third party who does not know a key for encryption from finding plaintexts corresponding to the ciphertexts based on the match between the prefix character strings. Therefore, for example, it is possible to prevent the third party who does not know an encryption key from extracting or acquiring specific numerical data using the magnitude relationship between numerical data forming the database and encrypted numerical data in the database. This can effectively improve the security of data in the database.

[Other Embodiments]

For example, if the user of a database encrypts an element and registers it in the database using the present invention, the administrator of the database cannot know the value of each element. On the other hand, if the user generates the ciphertext of a given value and a corresponding derived key, and sends them to the database, the administrator can select the ciphertext of a number larger or smaller than the value, and return it to the user. At this time, according to the ciphertext generation method of this embodiment, the administrator can know a block at which a plaintext corresponding to the sent ciphertext does not match a plaintext corresponding to each of ciphertexts, and know which ciphertext is larger, but cannot obtain other information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when a control program for implementing the functions of the embodiments is supplied to the system or apparatus directly or from a remote site. Hence, the present invention also incorporates the control program installed in a computer to implement the functions of the present invention by the computer, a medium storing the control program, and a WWW (World Wide Web) server that causes a user to download the control program. Especially, the present invention incorporates at least a non-transitory computer readable medium storing a control program that causes a computer to execute processing steps included in the above-described embodiments.

[Other Expressions of Embodiments]

Some or all of the above-described embodiments can also be described as in the following supplementary notes but are not limited to the followings.

(Supplementary Note 1)

There is provided a ciphertext generation apparatus comprising:

a derived key generator that generates a derived key based on a main key and a document;

an auxiliary derived key generator that generates an auxiliary derived key based on the main key, the document, and the derived key;

an identifier-specific ciphertext generator that generates, based on an identifier of the document, the derived key, and the auxiliary derived key, an identifier-specific ciphertext in which the identifier is encrypted; and a relative value ciphertext generator that generates, based on the identifier and the derived key, a relative value ciphertext in which a relative value generated from the main key, the document, and the derived key is encrypted, wherein a character string including the identifier-specific ciphertext and the relative value ciphertext is generated as a ciphertext for the document.

(Supplementary Note 2)

There is provided the ciphertext generation apparatus according to supplementary note 1, wherein the derived key generator, in descending order of $i=n-1, \ldots, 0$, generates an element $d[i]$ of the derived key by $Hash(K, (d[i+1], b[i]))$ according to a first hash function Hash: $\{0, 1\}^* \to \{0, 1\}^k$ using the main key, an element $b[i]$ of the document, and an already generated element $d[i+1]$ of the derived key, and the auxiliary derived key generator, in ascending order of $j=0, \ldots, n-1$, generates an element $g[j]$ of the auxiliary derived key by $Hash(K, d[j+1], 1-b[j])$ according to the first hash function using the main key, a bit inversion $(1-b[j])$ of an element $b[j]$ of the document, and an element $d[j+1]$ of the derived key.

(Supplementary Note 3)

There is provided the ciphertext generation apparatus according to supplementary note 1 or 2, wherein the identifier-specific ciphertext generator, in descending order of $p=n-1, \ldots, 0$, randomly selects a candidate of an element $c[p]$ of the identifier-specific ciphertext from $\{0, 1\}^{L[p]}$ when a safety variable $L[p] \in$ natural number, and adopts the candidate as the element $c[p]$ of the identifier-specific ciphertext when $0=Hash2(ID, d[p], c[p])$ mod 2 holds in a second hash function Hash2: $\{0, 1\}^* \to \{0, 1\}$ using an identifier ID and the element $d[p]$ of the derived key, and $1=Hash2(ID, g[p], c[p])$ mod 2 holds in the second hash function using the identifier ID and the element $g[p]$ of the auxiliary derived key.

(Supplementary Note 4)

There is provided the ciphertext generation apparatus according to any one of supplementary notes 1 to 3, wherein the relative value ciphertext generator includes a relative value generator that generates a relative value using the main key, the derived key, and the document, and a relative value concealer that generates a relative value ciphertext using the identifier, the derived key, and the relative value, the relative value generator, in ascending order of $q=0, \ldots, n-1$, generates an element $e[q]$ of the relative value by $e[q]=Hash3(0, K, d[q+1])+b[q]$ mod 3 according to a third hash function Hash3: $\{0, 1\}^* \to \{0, 1, 2\}$ using the main key, the document, and the derived key, and the relative value concealer, in ascending order of $q=0, \ldots, n-1$, generates an element $f[q]$ of the relative value ciphertext by $f[q]=Hash3(1, ID, d[q+1])+e[q]$ mod 3 according to the third hash function using the identifier ID, an element $d[q]$ of the derived key, and the element $e[q]$ of the relative value by setting $d[n]=K$.

(Supplementary Note 5)

There is provided a control method of a ciphertext generation apparatus, comprising:

generating a derived key based on a main key and a document;

generating an auxiliary derived key based on the main key, the document, and the derived key;

generating, based on an identifier of the document, the derived key, and the auxiliary derived key, an identifier-specific ciphertext in which the identifier is encrypted; and generating, based on the identifier and the derived key, a relative value ciphertext in which a relative value generated from the main key, the document, and the derived key is encrypted, wherein a character string including the identifier-specific ciphertext and the relative value ciphertext is generated as a ciphertext for the document.

(Supplementary Note 6)

There is provided a control program of a ciphertext generation apparatus for causing a computer to execute a method, comprising:

generating a derived key based on a main key and a document;

generating an auxiliary derived key based on the main key, the document, and the derived key;

generating, based on an identifier of the document, the derived key, and the auxiliary derived key, an identifier-specific ciphertext in which the identifier is encrypted; and generating, based on the identifier and the derived key, a relative value ciphertext in which a relative value generated from the main key, the document, and the derived key is encrypted, wherein a character string including the identifier-specific ciphertext and the relative value ciphertext is generated as a ciphertext for the document.

(Supplementary Note 7)

There is provided a ciphertext comparison apparatus comprising:

a first ciphertext acquirer that acquires a first ciphertext encrypted by a ciphertext generation apparatus defined in any one of supplementary notes 1 to 4, a first identifier, and a first derived key;

a second ciphertext acquirer that acquires a second ciphertext encrypted by the ciphertext generation apparatus defined in any one of supplementary notes 1 to 4, and a second identifier; and a ciphertext comparator that determines a magnitude relationship between a first document as an original of the first ciphertext and a second document as an original of the second ciphertext with maintaining these documents in a ciphertext form using the first ciphertext, the first identifier, the first derived key, the second ciphertext, and the second identifier.

(Supplementary Note 8)

There is provided the ciphertext comparison apparatus according to supplementary note 7, wherein the ciphertext comparator includes a maximum mismatch counter determiner, a relative value reconstructor, and a relative value comparator and determiner, the maximum mismatch counter determiner, in descending order of $r=n-1, \ldots, 0$, confirms whether an equation $0=\text{Hash}(\text{ID}', d[r], c'[r])$ according to a first hash function Hash: $\{0, 1\}^* \rightarrow \{0, 1\}^k$ holds, by using a second identifier ID', an element $d[r]$ of a derived key of a first identifier ID, and an element $c'[r]$ of an identifier-specific ciphertext of the second identifier ID', and determines, as a maximum mismatch counter r, r when the equation does not hold for the first time, the relative value reconstructor confirms whether $f[r]=\text{Hash3}(1, \text{ID}, d[r+1])+e \mod 3$ $f[r]=\text{Hash3}(1, \text{ID}', d[r+1])+e'$ mod 3 holds according to a third hash function Hash3: $\{0, 1\}^* \rightarrow \{0, 1, 2\}$ using the first identifier ID, an element $d[r+1]$ of the derived key, an element $f[r]$ of a relative value ciphertext of the first identifier ID, the second identifier ID', and an element $f'[r]$ of a relative value ciphertext of the second identifier ID' with respect to e and e' which satisfy e, $e' \in \{0, 1, 2\}$ for the maximum mismatch counter r, and generates a set of the relative values e and e' when the equation holds, and the relative value comparator and determiner outputs, as a determination result, a signal representing that a document of the first identifier ID is larger than a document of the second identifier ID' when $e-e'=(1 \mod 3)$ for the set of e and e', and outputs, as a determination result, a signal representing that the document of the second identifier ID' is larger than the document of the first identifier ID when $e-e'=(2 \mod 3)$.

(Supplementary Note 9)

There is provided a control method of a ciphertext comparison apparatus, comprising:

acquiring a first ciphertext encrypted by a ciphertext generation apparatus defined in any one of supplementary notes 1 to 4, a first identifier, and a first derived key;

acquiring a second ciphertext encrypted by the ciphertext generation apparatus defined in any one of supplementary notes 1 to 4, and a second identifier; and determining a magnitude relationship between a first document as an original of the first ciphertext and a second document as an original of the second ciphertext with maintaining these documents in a ciphertext form using the first ciphertext, the first identifier, the first derived key, the second ciphertext, and the second identifier.

(Supplementary Note 10)

There is provided a control program of a ciphertext comparison apparatus for causing a computer to execute a method, comprising:

acquiring a first ciphertext encrypted by a ciphertext generation apparatus defined in any one of supplementary notes 1 to 4, a first identifier, and a first derived key;

acquiring a second ciphertext encrypted by the ciphertext generation apparatus defined in any one of supplementary notes 1 to 4, and a second identifier; and determining a magnitude relationship between a first document as an original of the first ciphertext and a second document as an original of the second ciphertext with maintaining these documents in a ciphertext form, using the first ciphertext, the first identifier, the first derived key, the second ciphertext, and the second identifier.

(Supplementary Note 11)

There is provided a ciphertext comparison system comprising:

a derived key generator that generates a derived key based on a main key and a document;

an auxiliary derived key generator that generates an auxiliary derived key based on the main key, the document, and the derived key;

an identifier-specific ciphertext generator that generates, based on an identifier of the document, the derived key, and the auxiliary derived key, an identifier-specific ciphertext in which the identifier is encrypted;

a relative value ciphertext generator that generates, based on the identifier and the derived key, a relative value ciphertext in which a relative value generated from the main key, the document, and the derived key is encrypted; and a ciphertext comparator that determines a magnitude relationship between a first document as an original of a first ciphertext and a second document as an original of a second ciphertext with maintaining these documents in a ciphertext form, using a first derived key generated from the first document by the derived key generator, a first identifier of the first document, the first ciphertext including a first identifier-specific ciphertext in which the first identifier is encrypted by the identifier-specific ciphertext generator and a first relative value ciphertext in which a first relative value is encrypted by the relative value ciphertext generator, a second identifier of the second document, and the second ciphertext including a second identifier-specific ciphertext in which the second identifier is encrypted by the identifier-specific ciphertext generator and a second relative value ciphertext in which a second relative value is encrypted by the relative value ciphertext generator.

(Supplementary Note 12)

There is provided a ciphertext comparison method comprising:

generating a derived key based on a main key and a document;

generating an auxiliary derived key based on the main key, the document, and the derived key;

generating, based on an identifier of the document, the derived key, and the auxiliary derived key, an identifier-specific ciphertext in which the identifier is encrypted;

generating, based on the identifier and the derived key, a relative value ciphertext in which a relative value generated from the main key, the document, and the derived key is encrypted; and determining a magnitude relationship between a first document as an original of a first ciphertext and a second document as an original of a second ciphertext with maintaining these documents in a ciphertext form, using a first derived key generated from the first document in the generating the derived key, a first identifier of the first document, the first ciphertext including a first identifier-specific ciphertext in which the first identifier is encrypted in the generating the identifier-specific ciphertext and a first relative value ciphertext in which a first relative value is encrypted in the generating the relative value ciphertext, a second identifier of the second document, and the second ciphertext including a second identifier-specific ciphertext in which the second identifier is encrypted in the generating the identifier-specific ciphertext and a second relative value ciphertext in which a second relative value is encrypted in the generating the relative value ciphertext.

(Supplementary Note 13)

There is provided a key derivation apparatus comprising:

a derived key generator that generates a derived key based on a main key and a document; and an auxiliary derived key generator that generates an auxiliary derived key based on the main key, the document, and the derived key, wherein the derived key generator, in descending order of $i=n-1, \ldots, 0$, generates an element $d[i]$ of the derived key by $Hash(K, (d[i+1], b[i]))$ according to a first hash function $Hash: \{0, 1\}^* \rightarrow \{0, 1\}^k$ using the main key, an element $b[i]$ of the document, and an already generated element $d[i+1]$ of the derived key, and the auxiliary derived key generator, in ascending order of $j=n-1$, generates an element $g[j]$ of the auxiliary derived key by $Hash(K, d[j+1], 1-b[j])$ according to the first hash function using the main key, a bit inversion $(1-b[j])$ of an element $b[j]$ of the document, and an element $d[j+1]$ of the derived key.

This application claims the benefit of Japanese Patent Application No. 2013-211214, filed on Oct. 8, 2013, which is hereby incorporated by reference in its entirety.

The invention claimed is:

1. A ciphertext generation apparatus comprising:

a derived key generator stored in a memory and configured to generate a derived key based on a main key and a document;

an auxiliary derived key generator stored in the memory and configured to generate an auxiliary derived key based on the main key, a result of bit inversion of the document, and the derived key;

an identifier-specific ciphertext generator stored in the memory and configured to generate, based on an identifier of the document, the derived key, and the auxiliary derived key, an identifier-specific ciphertext in which the identifier is encrypted; and a relative value ciphertext generator stored in the memory and configured to generate, based on the identifier and the derived key, a relative value ciphertext in which a relative value generated from the main key, the document, and the derived key is encrypted, wherein a character string including the identifier-specific ciphertext and the relative value ciphertext is generated as a ciphertext for the document, and wherein said derived key generator, in descending order of $i=n-1, \ldots, 0$, generates an element $d[i]$ of the derived key by $Hash(K, (d[i+1], b[i]))$ according to a first hash function $Hash: \{0, 1\}^* \rightarrow \{0, 1\}^k$ using the main key, an element $b[i]$ of the document, and an already generated element $d[i+1]$ of the derived key, and said auxiliary derived key generator, in ascending order of $j=0, \ldots, n-1$, generates an element $g[j]$ of the auxiliary derived key by $Hash(K, d[j+1], 1-b[j])$ according to the first hash function using the main key, a bit inversion $(1-b[j])$ of an element $b[j]$ of the document, and an element $d[j+1]$ of the derived key.

2. The ciphertext generation apparatus according to claim 1, wherein said identifier-specific ciphertext generator, in descending order of $p=n-1, \ldots, 0$, randomly selects a candidate of an element $c[p]$ of the identifier-specific ciphertext from $\{0, 1\}^{L[p]}$ when a safety variable $L[p] \in$ natural number, and adopts the candidate as the element $c[p]$ of the identifier-specific ciphertext when $0=Hash2(ID, d[p], c[p])$ mod 2 holds in a second hash function $Hash2: \{0, 1\}^* \rightarrow \{0, 1\}$ using an identifier ID and the element $d[p]$ of the derived key, and $1=Hash2(ID, g[p], c[p])$ mod 2 holds in the second hash function using the identifier ID and the element $g[p]$ of the auxiliary derived key.

3. A control method of a ciphertext generation apparatus, comprising:

generating, by a derived key generator stored in a memory, a derived key based on a main key and a document;

generating, by an auxiliary derived key generator stored in the memory, an auxiliary derived key based on the main key, a result of bit inversion of the document, and the derived key;

generating, by an identifier-specific ciphertext generator stored in the memory, based on an identifier of the document, the derived key, and the auxiliary derived key, an identifier-specific ciphertext in which the identifier is encrypted; and generating, by a relative value ciphertext generator in the memory, based on the identifier and the derived key, a relative value ciphertext in which a relative value generated from the main key, the document, and the derived key is encrypted, wherein a character string including the identifier-specific ciphertext and the relative value ciphertext is generated as a ciphertext for the document, and wherein said derived key generator, in descending order of $i=n-1, \ldots, 0$, generates an element $d[i]$ of the derived key by $Hash(K, (d[i+1], b[i]))$ according to a first hash function $Hash: \{0, 1\}^* \rightarrow \{0, 1\}^k$ using the main key, an element $b[i]$ of the document, and an already generated element $d[i+1]$ of the derived key, and said auxiliary derived key generator, in ascending order of $j=0, \ldots, n-1$, generates an element $g[j]$ of the auxiliary derived key by $Hash(K, d[j+1], 1-b[j])$ according to the first hash function using the main key, a bit inversion (1-b[j]) of an element b[j] of the document, and an element d[j+1] of the derived key.

4. A non-transitory computer readable medium storing a control program of a ciphertext generation apparatus for causing a computer to execute a method, comprising:
generating a derived key based on a main key and a document;
generating an auxiliary derived key based on the main key, a result of bit inversion of the document, and the derived key;
generating, based on an identifier of the document, the derived key, and the auxiliary derived key, an identifier-specific ciphertext in which the identifier is encrypted; and
generating, based on the identifier and the derived key, a relative value ciphertext in which a relative value generated from the main key, the document, and the derived key is encrypted,
wherein a character string including the identifier-specific ciphertext and the relative value ciphertext is generated as a ciphertext for the document, and
wherein, in the generating the derive key, in descending order of i =n-1, . . . , 0, an element d[i] of the derived key by Hash(K, (d[i+1], b[i])) according to a first hash function Hash: $\{0, 1\}^* \rightarrow \{0, 1\}^k$ using the main key, an element b[i] of the document, and an already generated element d[i+1] of the derived key are generated, and
in the generation the auxiliary derived key, in ascending order of j =0, . . . , n-1, an element g[j] of the auxiliary derived key by Hash(K, d[j+1], 1-b[j]) according to the first hash function using the main key, a bit inversion (1-b[j]) of an element b[j] of the document, and an element d[j+1] of the derived key are generated.

5. A ciphertext comparison apparatus comprising:
a first ciphertext acquirer stored in a memory and configured to acquire a first ciphertext encrypted by a ciphertext generation apparatus, a first identifier, and a first derived key;
a second ciphertext acquirer stored in the memory and configured to acquire a second ciphertext encrypted by the ciphertext generation apparatus, and a second identifier; and
a ciphertext comparator stored in the memory and configured to determine a magnitude relationship between a first document as an original of the first ciphertext and a second document as an original of the second ciphertext with maintaining these documents in a ciphertext form, using the first ciphertext, the first identifier, the first derived key, the second ciphertext, and the second identifier, wherein
the ciphertext generation apparatus comprising:
a derived key generator stored in a memory and configured to generate a derived key based on a main key and a document;
an auxiliary derived key generator stored in the memory and configured to generate an auxiliary derived key based on the main key, a result of bit inversion of the document, and the derived key;
an identifier-specific ciphertext generator stored in the memory and configured to generate, based on an identifier of the document, the derived key, and the auxiliary derived key, an identifier-specific ciphertext in which the identifier is encrypted; and
a relative value ciphertext generator stored in the memory and configured to generate, based on the identifier and the derived key, a relative value ciphertext in which a relative value generated from the main key, the document, and the derived key is encrypted,
wherein a character string including the identifier-specific ciphertext and the relative value ciphertext is generated as a ciphertext for the document.

6. A control method of a ciphertext comparison apparatus, comprising:
acquiring a first ciphertext encrypted by a ciphertext generation apparatus, a first identifier, and a first derived key;
acquiring a second ciphertext encrypted by the ciphertext generation apparatus, and a second identifier; and
determining a magnitude relationship between a first document as an original of the first ciphertext and a second document as an original of the second ciphertext with maintaining these documents in a ciphertext form, using the first ciphertext, the first identifier, the first derived key, the second ciphertext, and the second identifier, wherein
the ciphertext generation apparatus comprising:
a derived key generator stored in a memory and configured to generate a derived key based on a main key and a document;
an auxiliary derived key generator stored in the memory and configured to generate an auxiliary derived key based on the main key, a result of bit inversion of the document, and the derived key;
an identifier-specific ciphertext generator stored in the memory and configured to generate, based on an identifier of the document, the derived key, and the auxiliary derived key, an identifier-specific ciphertext in which the identifier is encrypted; and
a relative value ciphertext generator stored in the memory and configured to generate, based on the identifier and the derived key, a relative value ciphertext in which a relative value generated from the main key, the document, and the derived key is encrypted,
wherein a character string including the identifier-specific ciphertext and the relative value ciphertext is generated as a ciphertext for the document.

7. A non-transitory computer readable medium storing a control program of a ciphertext comparison apparatus for causing a computer to execute a method, comprising:
acquiring a first ciphertext encrypted by a ciphertext generation apparatus according to claim 1, a first identifier, and a first derived key;
acquiring a second ciphertext encrypted by the ciphertext generation apparatus according to claim 1, and a second identifier; and
determining a magnitude relationship between a first document as an original of the first ciphertext and a second document as an original of the second ciphertext with maintaining these documents in a ciphertext form, using the first ciphertext, the first identifier, the first derived key, the second ciphertext, and the second identifier, wherein
the ciphertext generation apparatus comprising:
a derived key generator stored in a memory and configured to generate a derived key based on a main key and a document;
an auxiliary derived key generator stored in the memory and configured to generate an auxiliary derived key based on the main key, a result of bit inversion of the document, and the derived key;

an identifier-specific ciphertext generator stored in the memory and configured to generate, based on an identifier of the document, the derived key, and the auxiliary derived key, an identifier-specific ciphertext in which the identifier is encrypted; and a relative value ciphertext generator stored in the memory and configured to generate, based on the identifier and the derived key, a relative value ciphertext in which a relative value generated from the main key, the document, and the derived key is encrypted, wherein a character string including the identifier-specific ciphertext and the relative value ciphertext is generated as a ciphertext for the document.

8. A ciphertext comparison system comprising:

a derived key generator stored in a memory and configured to generate a derived key based on a main key and a document;

an auxiliary derived key generator stored in the memory and configured to generate an auxiliary derived key based on the main key, a result of bit inversion of the document, and the derived key;

an identifier-specific ciphertext generator stored in the memory and configured to generate, based on an identifier of the document, the derived key, and the auxiliary derived key, an identifier-specific ciphertext in which the identifier is encrypted;

a relative value ciphertext generator stored in the memory and configured to generate, based on the identifier and the derived key, a relative value ciphertext in which a relative value generated from the main key, the document, and the derived key is encrypted; and a ciphertext comparator that determines a magnitude relationship between a first document as an original of a first ciphertext and a second document as an original of a second ciphertext with maintaining these documents in a ciphertext form, using a first derived key generated from the first document by said derived key generator, a first identifier of the first document, a first ciphertext including a first identifier-specific ciphertext in which the first identifier is encrypted by said identifier-specific ciphertext generator and a first relative value ciphertext in which a first relative value is encrypted by said relative value ciphertext generator, a second identifier of the second document, and the second ciphertext including a second identifier-specific ciphertext in which the second identifier is encrypted by said identifier-specific ciphertext generator and a second relative value ciphertext in which a second relative value is encrypted by said relative value ciphertext generator.

9. A ciphertext comparison method comprising:

generating a derived key based on a main key and a document;

generating an auxiliary derived key based on the main key, a result of bit inversion of the document, and the derived key;

generating, based on an identifier of the document, the derived key, and the auxiliary derived key, an identifier-specific ciphertext in which the identifier is encrypted;

generating, based on the identifier and the derived key, a relative value ciphertext in which a relative value generated from the main key, the document, and the derived key is encrypted; and determining a magnitude relationship between a first document as an original of a first ciphertext and a second document as an original of a second ciphertext with maintaining these documents in a ciphertext form, using a first derived key generated from the first document in the generating the derived key, a first identifier of the first document, the first ciphertext including a first identifier-specific ciphertext in which the first identifier is encrypted in the generating the identifier-specific ciphertext and a first relative value ciphertext in which a first relative value is encrypted in the generating the relative value ciphertext, a second identifier of the second document, and the second ciphertext including a second identifier-specific ciphertext in which the second identifier is encrypted in the generating the identifier-specific ciphertext and a second relative value ciphertext in which a second relative value is encrypted in the generating the relative value ciphertext.

* * * * *